United States Patent
Gurunathan et al.

(10) Patent No.: US 11,587,090 B2
(45) Date of Patent: Feb. 21, 2023

(54) METHODS AND SYSTEMS FOR ADAPTING TIMEOUT PERIOD FOR AUTHENTICATION IN PAYMENT PROCESSING

(71) Applicant: MASTERCARD INTERNATIONAL INCORPORATED, Purchase, NY (US)

(72) Inventors: Arunmurthy Gurunathan, Pune (IN); Ajay Bahadur Singh Panwar, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 575 days.

(21) Appl. No.: 16/592,193

(22) Filed: Oct. 3, 2019

(65) Prior Publication Data
US 2020/0143375 A1    May 7, 2020

(30) Foreign Application Priority Data
Nov. 5, 2018    (SG) .......................... 10201809804X

(51) Int. Cl.
*G06Q 20/38* (2012.01)
*G06Q 20/40* (2012.01)
(Continued)

(52) U.S. Cl.
CPC ......... *G06Q 20/405* (2013.01); *G06Q 20/401* (2013.01); *G06Q 20/409* (2013.01);
(Continued)

(58) Field of Classification Search
None
See application file for complete search history.

(56) References Cited

U.S. PATENT DOCUMENTS 8,473,748 B2 *  6/2013  Sampas ............. G06Q 20/3224
                                                  713/182
9,679,293 B1 *  6/2017  Szwalbenest ...... G06Q 20/4014
(Continued)

FOREIGN PATENT DOCUMENTS

CN         107347080 A     11/2017
WO    WO-2020060432 A1 *   3/2020  ............. G06F 21/31

OTHER PUBLICATIONS

Handson, "Mobile-Based Multi-Factor Authentication Scheme for Mobile Banking", http://erepository.uonbi.ac.ke/bitstream/handle/11295/99267/Project%20Report-%20Mobile%20%E2%80%93%20Based%20Multi-Factor%20Authentication%20Scheme%20for%20Mobile%20Banking.pdf?sequence=1 (Year: 2016).*
(Continued)

*Primary Examiner* — Ryan D Donlon
*Assistant Examiner* — Mark A Malkowski
(74) *Attorney, Agent, or Firm* — Jordan IP Law, LLC

(57) ABSTRACT

Embodiments provide payment methods, server systems and devices for dynamically adapting a timeout period. The method includes receiving, by a server system associated with a payment network, a payment transaction request from a merchant interface. The payment transaction request includes a payment information and a payment card information of a user. After receiving the payment transaction request, a plurality of authentication options may be presented to the user for authenticating the payment transaction. The user may select an authentication option from the plurality of authentication options. A timeout period for authenticating a payment transaction is determined based on the authentication option selected by the user. The timeout period is determined using a set of predefined rules. Moreover, the timeout period may be dynamically adapted based on the authentication option and one or more of a plurality
(Continued)

| RULE REFERENCE 702 | AUTHENTICATION OPTION 704 | TIMEOUT PERIOD 706 |
|---|---|---|
| RULE 1 | OTP | TIMER 1 |
| RULE 2 | STATIC PASSWORD | TIMER 2 |
| RULE 3 | OVERRIDING.<br>1. OTP TO STATIC PASSWORD | TIMER 2 |
|  | 2. STATIC PASSWORD TO OTP | MAX (TIMER 1, TIMER 2) |
| ⋮ | ⋮ | ⋮ |

708 → RULE 1
710 → RULE 2
712 → RULE 3

700 of timers, a plurality of usage analytics data and a user profile information.

14 Claims, 16 Drawing Sheets

(51) Int. Cl.
    *G06F 3/04847*     (2022.01)
    *G06F 3/0482*     (2013.01)
(52) U.S. Cl.
    CPC ........ *G06F 3/0482* (2013.01); *G06F 3/04847* (2013.01); *G06Q 20/385* (2013.01); *G06Q 20/40145* (2013.01)

(56) References Cited

U.S. PATENT DOCUMENTS

| | | | | |
|---|---|---|---|---|
| 10,013,537 | B1* | 7/2018 | Trachtman | G06F 21/31 |
| 10,783,227 | B2* | 9/2020 | Van Os | G06F 3/016 |
| 10,929,515 | B2* | 2/2021 | Prakash | H04L 9/085 |
| 11,114,087 | B1* | 9/2021 | Leslie | H04L 51/02 |
| 2011/0055376 | A1 | 3/2011 | Little | |
| 2012/0054046 | A1* | 3/2012 | Albisu | G06Q 20/20 |
| | | | | 705/16 |
| 2012/0137217 | A1* | 5/2012 | Amsterdam | G06F 40/289 |
| | | | | 715/256 |
| 2014/0082403 | A1 | 3/2014 | Kraev | |
| 2014/0119195 | A1* | 5/2014 | Tofighbakhsh | H04W 52/0251 |
| | | | | 370/328 |
| 2014/0143670 | A1* | 5/2014 | Swaminathan | H04L 65/612 |
| | | | | 715/720 |
| 2014/0304798 | A1 | 10/2014 | Iyengar et al. | |
| 2015/0213427 | A1* | 7/2015 | Hodges | G07F 19/2055 |
| | | | | 705/18 |
| 2016/0048836 | A1 | 2/2016 | Sabatier et al. | |
| 2018/0012222 | A1* | 1/2018 | Berger | H04W 4/02 |
| 2018/0084419 | A1* | 3/2018 | Sun | H04L 9/08 |
| 2018/0183805 | A1 | 6/2018 | Gonzalez Corona | |
| 2018/0218366 | A1 | 8/2018 | Storiale | |
| 2019/0065724 | A1* | 2/2019 | Dudley | H04L 9/3271 |
| 2019/0356491 | A1* | 11/2019 | Herder, III | H04L 9/0894 |

OTHER PUBLICATIONS

EMVCo, "EMV® 3-D Secure, Protocol and Core Functions Specification—Version 2.1.0", Oct. 2017, accessible on https://www.emvco.com/document-search/ (Year: 2017).*
First Examination Report for Indian Patent Application No. 201914037677, dated Mar. 3, 2021, 5 pages.

* cited by examiner

| USER NAME 502 | AUTHENTICATION OPTION 504 | AUTHENTICATION TIME FOR LAST FIVE TRANSACTIONS (MIN : SEC) 506 | AVERAGE AUTHENTICATION TIME 508 |
|---|---|---|---|
| JOHN LEWIS | OTP | 02 : 30<br>02 : 35<br>02 : 20<br>02 : 39<br>02 : 40 | 02 : 33 |
| | STATIC PASSWORD | 01 : 05<br>00 : 59<br>00 : 45<br>00 : 46<br>00 : 48 | 00 : 48 |
| ⋮ | ⋮ | ⋮ | ⋮ |

| USER NAME 602 | USER DEVICE 604 | OPERATING SYSTEM 606 | WEB BROWSER 608 | TYPING SPEED (WORDS PER MINUTE, WPM) 610 | AUTHENTICATION OPTION 612 | AVERAGE TIME (MIN:SEC) 614 |
|---|---|---|---|---|---|---|
| JOHN LEWIS | TABLET | WINDOWS | MOZILLA FIREFOX | 80 - 85 | OTP | 02:55 |
| | | | | | STATIC PASSWORD | 00:30 |
| | LAPTOP | LINUX | GOOGLE CHROME | 75 - 80 | OTP | 02:40 |
| | | | | | STATIC PASSWORD | 00:55 |
| | MOBILE PHONE | ANDROID | OPERA MINI | 85 - 90 | OTP | 03:00 |
| | | | | | STATIC PASSWORD | 00:35 |
| .... | .... | .... | .... | .... | .... | .... |

| RULE REFERENCE 702 | AUTHENTICATION OPTION 704 | TIMEOUT PERIOD 706 |
|---|---|---|
| RULE 1 | OTP | TIMER 1 |
| RULE 2 | STATIC PASSWORD | TIMER 2 |
| RULE 3 | OVERRIDING: | |
| | 1. OTP TO STATIC PASSWORD | TIMER 2 |
| | 2. STATIC PASSWORD TO OTP | MAX (TIMER 1, TIMER 2) |
| ⋮ | ⋮ | ⋮ |

708 → RULE 1
710 → RULE 2
712 → RULE 3

700

FIG. 7

METHODS AND SYSTEMS FOR ADAPTING TIMEOUT PERIOD FOR AUTHENTICATION IN PAYMENT PROCESSING

CROSS-REFERENCE TO RELATED APPLICATIONS

The present application claims priority to Singapore Patent Application No. 10201809804X (filed on Nov. 5, 2018), which is hereby incorporated by reference in its entirety.

TECHNICAL FIELD

The present disclosure relates to payment technology and, more particularly to, methods and systems for adapting timeout period associated with an authentication session in payment processing.

BACKGROUND

The world has seen a dramatic change in buying/selling of goods/services with the advent of electronic devices. Nowadays, many customers purchase from an e-commerce site or an online retailer (referred to hereinafter as 'a merchant site') at the comfort of their home via the electronic devices. The merchant site generally accepts digital payments for the goods/services from the customers. Generally, payment transactions for the goods/services are performed through a payment gateway and a payment network that act as a medium between a merchant and a customer that authenticates and processes the payment transaction securely. For instance, the payment gateway and network help in exchanging information between the customer's bank (e.g., an issuing bank) and the merchant's bank (e.g., an acquiring bank). At the time of checkout after the purchase at the merchant site, the customer is redirected to a payment gateway site and the customer provides payment card information for the payment transaction.

After providing the payment card information, the identity of the customer is authenticated prior to further processing the payment transaction. The customer is usually provided a time frame (i.e. an authentication session) for validating the identity of the customer. Typically, the authentication session is predefined and non-configurable that may be inefficient at times. For instance, the authentication session may be fixed with a timeout period of 3 minutes for authenticating the identity of the customer. In an example scenario, the customer may authenticate his/her identity by means of a static password or a One-Time Password (OTP). The static password may be provided within a few seconds of commencement of the authentication session such that a time period required for providing authentication information may be quite less as compared to the authentication session of 3 minutes which is fixed for every payment transaction. However, authentication process using the OTP may take more than that of the static password. In one instance, the customer may need only 1 minute of the authentication session of 3 minutes and 2 minutes of the authentication session may be left unused. In such instances, the authentication session may be on-hold for 2 minutes that may result in inefficient utilization of resources. In addition to this, if the authentication session is on-hold, then vulnerability to fraud and unwanted situations may be high.

Accordingly, there is a need for a method to overcome the above-mentioned problems and facilitate a technique that helps in managing a timeout period of the authentication session for a payment transaction. Moreover, there is a need to configure the timeout period for efficiently and securely authenticating the payment transaction.

SUMMARY

Various embodiments of the present disclosure provide methods and systems for managing timeout period of an authentication session for a payment transaction.

In an embodiment, a method is disclosed. The method includes receiving, by a server system associated with a payment network, a payment transaction request for a payment transaction by a payment card of a user. The payment transaction request includes a payment card information of the payment card of the user. The method includes upon receiving the payment transaction request, facilitating, by the server system, a selection of an authentication option from a plurality of authentication options presented to the user on an issuer interface associated with an issuer of the payment card. The plurality of authentication options is presented for authenticating a payment transaction associated with the payment transaction request. The method further includes upon receiving the selection of the authentication option, dynamically adapting, by the server system, a timeout period of an authentication session for authenticating the payment transaction based on the selection of authentication option.

In another embodiment, a server system is disclosed. The server system includes a memory that includes executable instructions and a processor. The processor is communicably configured to execute the instructions to cause the server system to at least perform receiving a payment transaction request from a merchant interface for a payment transaction by a payment card of a user. The payment transaction request includes a payment card information. The server system is caused to at least perform facilitating a selection of an authentication option from a plurality of authentication options presented to the user on an issuer interface associated with an issuer of the payment card, upon receiving the payment transaction request. The plurality of authentication options is presented for authenticating the payment transaction associated with the payment transaction request. The server system is further caused to at least perform upon receiving the authentication option, dynamically adapting a timeout period of an authentication session for authenticating the payment transaction based on the authentication option.

In yet another embodiment, a method for dynamically adapting a timeout period of a payment transaction is disclosed. The method includes receiving, by a server system associated with a payment network, a payment transaction request initiated from a merchant interface for the payment transaction by a payment card of a user. The payment transaction request includes a payment card information of the payment cards of the user. The method includes provisioning, by the server system, a plurality of authentication options for the user to authenticate the payment transaction on an issuer interface associated with an issuer of the payment card, the plurality of authentication options includes a one-time password (OTP) option and a static password option, upon receiving the payment transaction request. The method includes receiving, by the server system, a selection of an authentication option among the plurality of options from the user. The method further includes adapting, by the server system, the timeout period of an authenticating session for authenticating the payment transaction based on the selection of the authentication option, and one or more of: a set of predefined rules, a plurality of usage analytics data and a user profile information.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 6 illustrates a schematic representation of a table for depicting a plurality of usage analytics data of the user collected from a user device and maintained at the server system, in accordance with an example embodiment of the present disclosure;

FIG. 7 illustrates a schematic representation of a table for depicting a set of predefined rules for determining a timeout period maintained at the server system, in accordance with an example embodiment of the present disclosure;

Figure 1:
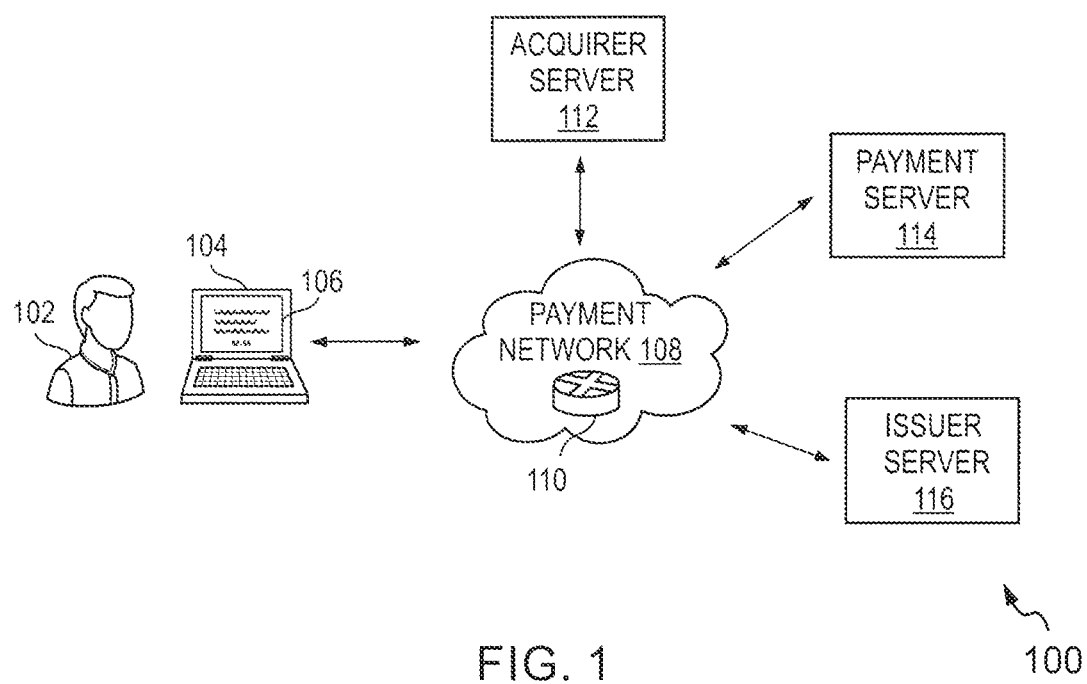
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by PayPal®, and the like.

The term "payment card", refers to a physical or virtual card linked with a financial or payment account that may be presented to a merchant or any such facility in order to fund a financial transaction via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment network", refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

OVERVIEW

Various example embodiments of the present disclosure provide methods and systems for adapting timeout period of an authentication session based on an authentication option selected by a user that overcome obstacles mentioned in the background. More specifically, techniques disclosed herein enable determining a timeout period for authenticating a payment transaction based on the authentication option. Herein, the term "adapting" implies dynamically changing or adjusting the timeout period based on the authentication option and a set of predefined rules. Moreover, timeout period may be dynamically adapted based on the authentication option, the set of predefined rules, a plurality of usage analytics data and a user profile information, as described later.

In many example scenarios, a user may buy goods/services at an online store (referred to hereinafter as 'a merchant interface') hosted and managed by a merchant. The online store may include e-commerce websites, online retail stores, e-business service providers, etc. The user may make a payment transaction to the merchant on the merchant interface through a payment gateway using a payment card. The payment gateway further facilitates the user to authenticate the payment transaction at an issuer interface hosted and managed by the issuer server. A payment transaction request is initiated at the merchant interface and is sent to the issuer server via a payment server. The payment transaction request includes information of the payment card of the user and a preference of the user for authenticating the payment transaction at the issuer interface. The issuer server redirects the user from the merchant interface to the issuer interface for authenticating the payment transaction. The user is provided with a plurality of authentication options to select an authentication option for validating authentication of the payment card and/or the user. Some examples of the plurality of authentication options may include, but are not limited to, a One-Time Password (OTP) option, a Quick-Response (QR) code option, a static password option and a biometric-based password option.

As the user selects the authentication option of the issuer interface, the issuer interface initiates an authentication session with a timeout period for the user to complete the authentication process. The process of authenticating the payment transaction starts when the timeout period of the authentication session is initiated. In one embodiment, the timeout period may be determined based on an authentication option and a set of predefined rules. The set of predefined rules may be stored in a database, such as a rule database managed by the issuer server. The predefined rules employ a plurality of timers to define the timeout period for the authentication session. Each timer may be associated with an authentication option of the plurality of authentication options. For instance, the OTP option may be associated with a first timer and the static password option may be associated with a second timer. Likewise, the QR code option and the biometric-based password option may be associated with different timers. In one example embodiment, the plurality of timers may also be configured based on a user preference input provided by the user.

In some example embodiments, the timeout period may be determined based on the authentication option, the set of predefined rules, a plurality of usage analytics data and a user profile information. The plurality of usage analytics data may be accessed from the user device of the user via the merchant interface. The plurality of usage analytics data may include one or more of a type of user device, a web browser information and a typing speed of the user. Optionally, historical usage analytics data associated with historical payment transactions may also be used to determine the timeout period. The user profile information may include a historical authentication time for authenticating historical payment transactions based on the authentication option. In one example scenario, the authentication option selected by the user may be overridden by an alternate authentication option for authenticating the payment transaction. The alternate authentication option may be selected from a remainder of the plurality of authentication options. In such cases, the issuer server looks up the set of predefined rules to determine a predefined rule that corresponds to overriding of an authentication option by the alternate authentication option.

The methods and systems for dynamically adapting the timeout period of an authentication session for authenticating a payment transaction is further explained in detail with reference to FIGS. 1 to 16.

FIG. 1 illustrates an example representation of an environment 100, in which at least some example embodiments of the present disclosure can be implemented. The environment 100 is depicted to include a user 102 associated with a user device 104. The user device 104 may include a smartphone, a tablet, a laptop, a computer system or any electronic device through which the user 102 can access a merchant interface 106 of a merchant for purchasing goods/services in exchange for money. The merchant interface 106 includes, but not limited to, e-commerce websites, online retail stores, and e-business service providers. The merchant interface 106 may be accessed through a mobile application or a web browser in the user device 104.

When the user 102 checks out, goods/services purchased by the user 102 are collected in an e-cart that is displayed to the user 102 in the merchant interface 106. In one example embodiment, when the user 102 checks out, the user 102 may be redirected to a payment page in the merchant interface 106. In the payment page, the user 102 may be requested to provide payment information, such as, a payment amount for the merchant, payment card information of the user 102 such as card number, expiry details, CVV etc. Additionally, the user 102 may be presented with an option in the payment page for authenticating the payment transaction securely at an issuer interface. When the user 102 provides a selection input on the option, the user 102 may be redirected to the issuer interface (shown in FIG. 9). The issuer interface may be hosted and managed by an issuer server 116. The payment card information may be encrypted by a payment gateway 110. In one example, the payment gateway 110 may be associated with a payment network 108. In another example, the payment gateway 110 may be provided by a third-party service provider which enables secure payment transactions for the merchant via the merchant interface 106. In an embodiment, a payment transaction request is generated by the merchant interface 106. The payment transaction request includes the payment amount, the encrypted payment card information from the payment gateway 110 and optionally the option for authenticating the user 102 via the issuer interface.

The merchant interface 106 sends the payment transaction request to an acquirer server 112 via the payment network 108. Examples of the payment network 108 include, but not limited to, Mastercard® payment system interchange network. The Mastercard® payment system interchange network is a proprietary communications standard promulgated by Mastercard® International Incorporated for the exchange of financial transaction data between financial institutions that are members of Mastercard International Incorporated® (Mastercard is a registered trademark of Mastercard® International Incorporated located in Purchase, N.Y.). The acquirer server 112 sends the payment transaction request to a payment server 114. The payment server 114 receives the payment transaction request and forwards the payment transaction request to the issuer server 116 upon reading the option for authenticating the user 102 via the issuer interface.

The issuer server 116 receives the payment transaction request and facilitates a plurality of authentication options for the user 102 to authenticate the payment transaction at the merchant interface 106 via the issuer interface. The plurality of authentication options may include, but not limited to, a One-Time password (OTP) option, a Quick-Response (QR) code, a static password option, and a biometric-based password option. The user 102 may select an authentication option from the plurality of authentication options. The user 102 has to authenticate the payment transaction within a timeout period of an authentication session in the issuer interface. The authentication of the payment transaction starts when the timeout period is initiated. The issuer server 116 is therefore configured to dynamically determine the timeout period for the authentication session based at least on the authentication option selected by the user 102.

In one example embodiment, the timeout period for the authentication session may be determined based on the authentication option selected by the user 102 and a set of predefined rules. In some example embodiments, the timeout period may be dynamically adapted based on a plurality of timers. Each timer of the plurality of timers may be associated with an authentication option of the plurality of authentication options. In another example embodiment, the timeout period may be determined based on the authentication option and one or more timers of the plurality of timers associated with the authentication option, a plurality of usage analytics data and a user profile information. In at least one example embodiment, the plurality of timers may be configured based on a user preference input provided by the user 102 for the plurality of authentication options. For instance, the user 102 can preset the timeout period of an authentication session for each authentication option of the plurality of authentications options. In an example, the user can preset timeout period as 45 seconds for static passwords, 30 seconds for biometric based passwords and 2 minutes for OTP passwords. The plurality of usage analytics data may include one or more of a type of the user device 104, a web browser information and a typing speed of the user 102. The plurality of usage analytics data may be collected by the merchant interface 106 from the user device 104. The user profile information may include a set of historical authentication time for authenticating a corresponding set of historical payment transactions based on the authentication option selected for each historical payment transaction.

Moreover, the user 102 may choose an alternate authentication option to override the authentication option selected prior by the user 102 for authenticating the payment transaction. The alternate authentication option may be selected from a remainder of the plurality of authentication options. For example, the user 102 may choose to authenticate the payment transaction using a static password and if the user 102 is not able to recollect the static password from memory, he/she may switch over to authenticate the payment transaction via other options, for example, using the OTP password. In such cases, assuming the static password to be associated with a first timer and the OTP password to be associated with a second timer, the timeout period may be adapted based on the first timer, the second timer or a combination of the first timer and the second timer as defined by a set of predefined rules. In an example, a predefined rule may be defined in the set of predefined rules when a choice of the static password for authentication is overridden when the user 102 swaps to authenticate the payment transaction using the OTP based password. For example, when the static password is selected the first timer may be initiated and when the user 102 swaps to select a biometric based option for authenticating the payment transaction, the issuer server 116 looks up the set of predefined rules to determine a predefined rule that may indicate that a maximum of remaining time of the first timer and the second timer (max(remaining time of the first timer, the second timer)) may be determined as the timeout period for the authentication session. The authentication session may be terminated upon expiry of the timeout period.

After authenticating the payment transaction, the issuer server 116 checks a balance amount in an issuer account of the user 102 for validating the payment amount for the payment transaction. After validating the payment amount in the issuer account of the user 102, the issuer server 116 debits funds equal in amount to the payment amount from the issuer account of the user 102. The payment amount is passed to a merchant account of the merchant (hosting and managing goods/services via the merchant interface 106) to complete the payment transaction.

Some non-exhaustive example embodiments of determining a timeout period and dynamically adapting the timeout period of an authentication session for authenticating a payment transaction is described with reference to FIGS. 2A-2C to 16.

Figure 2A:
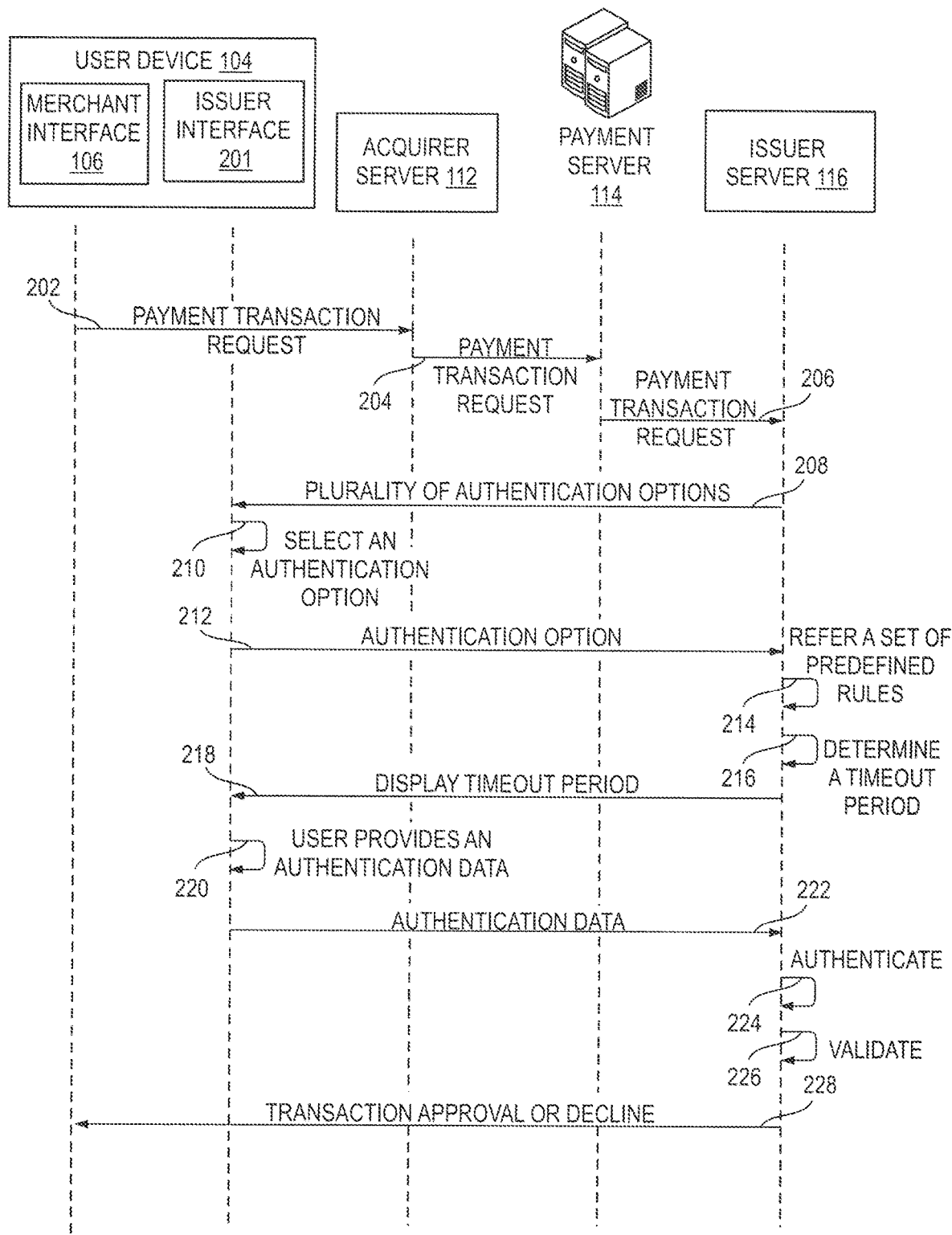
FIG. 2A represents a sequence flow diagram of determining a timeout period for an authentication session based on an authentication option selected by a user, in accordance with an example embodiment of the present disclosure.

FIG. 2A represents a sequence flow diagram 200 of determining a timeout period of a payment transaction based on an authentication option selected by the user 102, in accordance with an example embodiment of the present disclosure. The user 102 may purchase goods/services from a merchant via the merchant interface 106. When the user 102 performs a check out, a payment transaction request is generated.

At 202, the merchant interface 106 sends the payment transaction request to the acquirer server 112. The payment transaction request includes the payment card information such as including but not limited to card number, expiry date, CVV number of the payment card.

At 204, the acquirer server 112 sends the payment transaction request to the payment server 114. When the payment server 114 reads the payment transaction request, the payment server 114 identifies the issuer server 116. At 206, the payment server 114 sends the payment transaction request to the issuer server 116.

At 208, the issuer server 116 provides a plurality of authentication options for authenticating the payment transaction to the user 102. In an embodiment, the issuer server 116 provisions an issuer interface 201 for the user 102 to authenticate the payment transaction. The issuer interface 201 displays the plurality of authentication options for the user 102. Examples of the plurality of authentication options include but not limited to an OTP option, a QR code option, a static password option and a biometric-based password option.

At 210, the user 102 selects an authentication option from the plurality of authentication options displayed on the issuer interface 201. For example, the user 102 may provide a selection input on the OTP option from the plurality of authentication options.

At 212, the issuer interface 201 sends the authentication option selected by the user 102 to the issuer server 116. At 214, after receiving the authentication option, the issuer server 116 refers a set of predefined rules. In one embodiment, the set of predefined rules are defined based on one or more timers of a plurality of timers. For example, timer 1 may be defined for OTP option, timer 2 may be defined for QR code option and timer 3 may be defined for static password option. An example of a predefined rule may be to initiate timer 1 when the user 102 select the OTP option for authentication of the payment transaction. In an example scenario, the user 102 may select the static password option for authentication and may then choose to authenticate using the QR code option. In such a case, the issuer server 116 looks up the set of predefined rules to identify a predefined rule that matches with swap in choice of option for authenticating the payment transaction from the static password to QR password. In this case, the timer may be defined as max of timer 2 and timer 3. In at least some example embodiments, the plurality of timers may be customized based on a user preference input provided by the user 102. For instance, the user 102 may provide the user preference input such that, timer 1 for the OTP option may be configured for 2 minutes, timer 2 for the QR code option may be configured as 1 minute and 30 seconds and the timer 3 for the static password option may be configured for 30 second. The set of predefined rules is referred for determining a timeout period for authenticating the payment transaction. An example table depicting a sample set of predefined rules is shown and explained with reference to FIG. 7.

At 216, a timeout period is determined by the issuer server 116 based on the authentication option and the set of predefined rules. In an example embodiment, the issuer server 116 may look up the predefined set of rules based on the authentication option selected by the user 102 to determine the timeout period. The predefined set of rules define the timeout period in form of plurality of timers. Each predefined rule is associated with one or more timers. The plurality of timers may be preset, or customized based on a user preference input. The timeout period indicates a time frame within which the user 102 can authenticate the payment transaction in an authentication session. A simple example of a set of predefined rules may be as follows:

If authentication_option=static password, then timer 1; and

If authentication_option=OTP, then timer 2.

Assuming timer 1=1 minute and timer 2=2 minute and 30 seconds, if the user 102 chooses to authenticate the payment transaction using static password, then the timeout period for the authentication session is defined by the timer 1 of 1 minute. Alternatively, if the user 102 chooses the OTP authentication, the timeout period for the authentication session is defined as 2 minute and 30 seconds. The authentication session expires upon expiry of the timeout period.

At 218, the timeout period is displayed to the user 102 during an authentication session in the issuer interface 201. For example, if the user 102 selects authentication option as static password, the issuer server 116 determines the timeout period for the authentication session as 1 minute based on a corresponding predefined rule of the predefined set of rules. The timeout period of 30 seconds is displayed on the issuer interface 201 for the user 102.

At 220, the user 102 enters an authentication data corresponding to the authentication option selected in the issuer interface 201 during the authentication session. For example, if the user 102 has selected authentication option as the static password, the user 102 may be prompted to provide a fixed length password, for example, Personal Identification Number (PIN) on the issuer interface 201. In an example, the user 102 provides a string "5271" as the static password, the string "5271" is referred to as the authentication data.

At 222, the authentication data is sent to the issuer server 116. The authentication data may include an OTP, a static password, a QR code or a biometric-based password, such as a fingerprint data, a facial scan data, an iris pattern data, etc. At 224, the issuer server 116 receives the authentication data and authenticates the payment transaction. For example, the issuer server 116 may compare the authentication data with a pre-stored authentication data corresponding to the authentication option selected by the user 102. If the authentication data provided by the user 102 matches with the pre-stored authentication data, the payment transaction is further processed else the payment transaction is declined.

At 226, the issuer server 116 validates the payment transaction. The issuer server 116 checks availability of balance for debiting the payment amount from an issuer account of the user 102 for the good/services purchased at the merchant via the merchant interface 106.

At 228, the issuer server 116 sends a notification including a payment transaction approval or decline message to the user device 104 via the payment server 114. The payment transaction approval or decline message may be displayed on the merchant interface 106 or the issuer interface 201. Optionally, the notification including the payment transaction approval or decline message is also sent to the acquirer server 112.

Figure 2B:
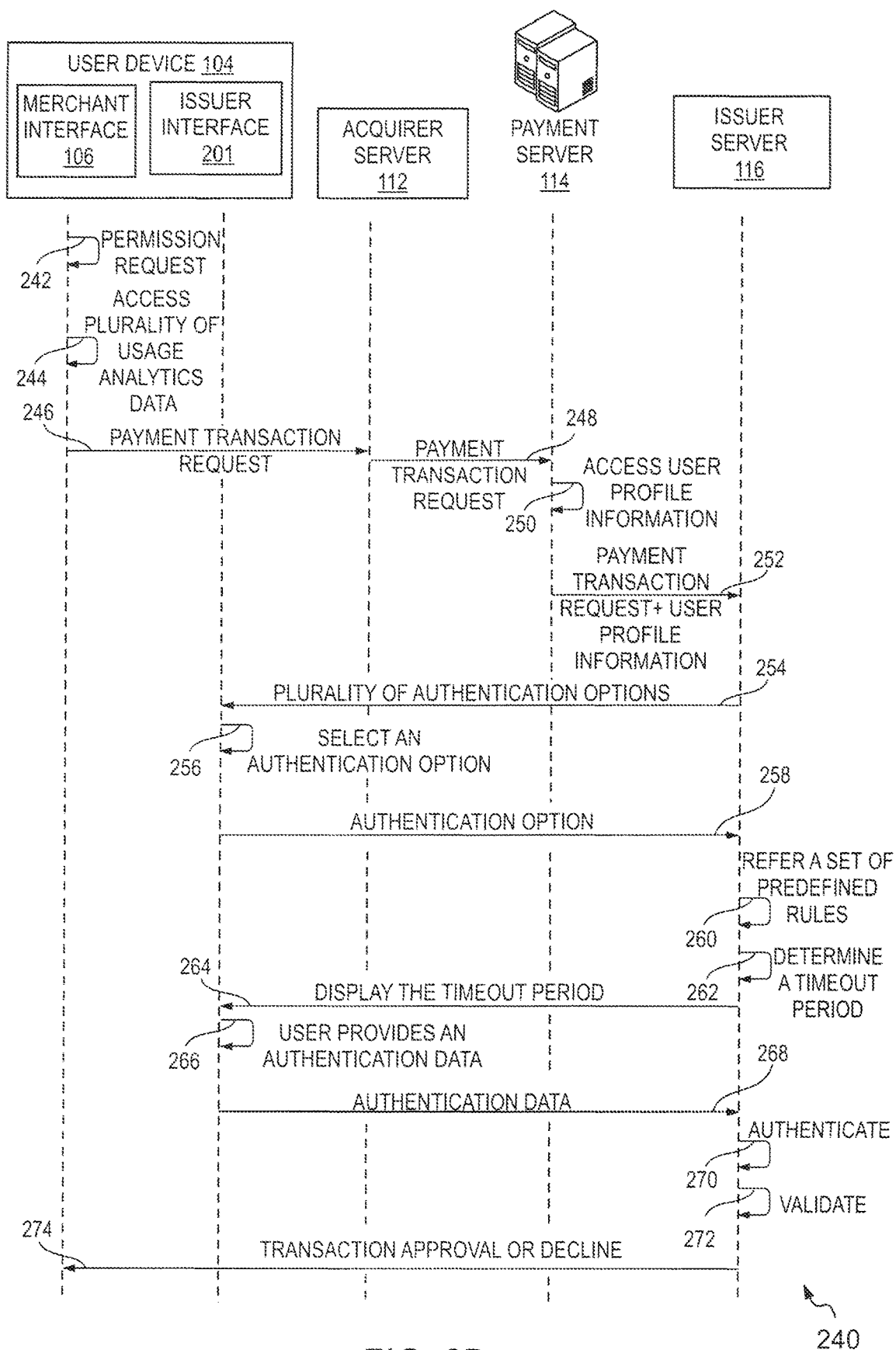
FIG. 2B represents a sequence flow diagram of determining a timeout period for an authentication session based on an authentication option selected by a user, in accordance with another example embodiment of the present disclosure.

FIG. 2B represents a sequence flow diagram 240 of determining a timeout period based on an authentication option selected by the user 102, in accordance with another example embodiment of the present disclosure. The user 102 may purchase goods/services from a merchant via the merchant site 106. The user 102 provides payment card information for making a payment transaction via the merchant interface 106. The payment transaction may be securely processed via the payment gateway 110 and an authentication session extending for a timeout period may be provided for authenticating the payment transaction. The timeout period may be determined and dynamically adapted based on an authentication option, a plurality of usage analytics data and a user profile information.

At 242, the merchant interface 106 may send a permission request to the user device 104 for accessing a plurality of usage analytics data from the user device 104.

In some examples, when the user 102 accesses the merchant interface 106, the merchant interface 106 may send the permission request as a pop up box requesting permission to access the plurality of usage analytics data. In one example embodiment, the permission request may be sent via Application Program Interface (API) calls to fetch details, such as a type of the user device 104, web browser details, server log details, usage activities, typing speed of the user etc.

At 244, the merchant interface 106 accesses the plurality of usage analytics data in the user device 104. The user 102 may grant permission for the merchant interface 106 to read the plurality of usage analytics data from the user device 104. The merchant interface 106 reads the plurality of usage analytics data from the user device 104. It should be noted that the steps 242 and 244 may be performed at periodic intervals and can be performed at the same time of initiating the payment transaction and/or anytime before initiating the payment transaction.

At 246, the user 102 sends a payment transaction request to the acquirer server 112 via the merchant interface 106. When the user 102 proceeds to check-out after purchasing goods/services via the merchant interface 106, a payment page prompts the user 102 to provide payment card information for making a transaction corresponding to a payment amount for the goods/services at the merchant interface 106. Additionally, the payment page also includes an option for the user 102 to authenticate the payment transaction at the issuer interface 201 provided by the issuer server 116. The user 102 may choose to securely authenticate the payment transaction via the issuer interface 201. When the user 102 provides the payment card information and optionally selects the option, the payment transaction request is generated by the merchant interface 106. The payment transaction request includes the payment card information, the payment amount, the plurality of usage analytics data and the option for authenticating the payment transaction at the issuer interface 201.

At 248, the acquirer server 112 forwards the payment transaction request to the payment server 114. At 250, the payment server 114 reads the payment transaction request and performs a look up in a table storing user profile information for accessing a user profile information of the user 102. The user profile information of the user 102 includes a set of historical authentication times for authenticating payment transactions using each of the plurality of authentication options. For example, historical authentication time associated with each of the past five payment transactions that were authenticated using an OTP option, a biometric option and a static password option, are stored in the table as the user profile information. An example of the table storing the user profile information of a user is shown and explained with reference to FIG. 5. Optionally, the payment server 114 may also host and manage a table that stores historical usage analytics data associated with the user 102 while performing historical payment transaction using different authentication options. Additionally or alternatively, historical usage analytics data may also be used to determine the timeout period. An example of a table storing historical usage analytics data is shown and explained with reference to FIG. 6.

At 252, the payment server 114 sends the payment transaction request including the user profile information to the issuer server 116. In one example embodiment, the user 102 is routed to the issuer interface 201 provided by the issuer server 116 from the merchant interface 106 as the user 102 chose to authenticate the payment transaction via the issuer interface 201. In some alternate embodiments, the user profile information and/or the historical usage analytics data may be stored at the issuer server 116, instead of the payment server 114, or may be stored at both the servers i.e. the servers 114 and 116.

At 254, the issuer server 116 displays a plurality of authentication options to the user 102 on the user deice 104 via the issuer interface 201 for authenticating the payment transaction.

At 256, the user 102 selects an authentication option from the plurality of authentication options. At 258, the authentication option selected by the user 102 is sent to the issuer server 116. At 260, the issuer server 116 refers a set of predefined rules after receiving the authentication option from the user 102. The set of predefined rules are used to dynamically determine a timeout period for an authentication session. A simplified example of a predefined rule would be as follows:

authentication_option=static password & historical_authentication time_static=10 seconds & typing speed=80<x<85 & web_browser=Mozilla firefox & user device_type=min (10 seconds, timer 1)

At 262, a timeout period is determined based on the authentication option, the plurality of usage analytics data and the user profile information using the set of predefined rules. At 264, the timeout period is displayed to the user 102 on the issuer interface 201. Once the timeout period starts, an authentication session is initiated. At 266, the user 102 enters the authentication data. At 268, the authentication data is sent to the issuer server 116.

At 270, the issuer server 116 receives the authentication data and authenticates the payment transaction. At 272, the issuer server 116 validates the payment transaction. The issuer server 116 checks balance availability for debiting the payment amount from an issuer account of the user 102.

At 274, the issuer server 116 sends a notification including a payment transaction approval or decline message to the user device 104.

In an example embodiment, the set of predefined rules in the issuer server 116 may be configured based on a user preference input of the user 102, which is explained with reference to FIG. 2C.

Figure 2C:
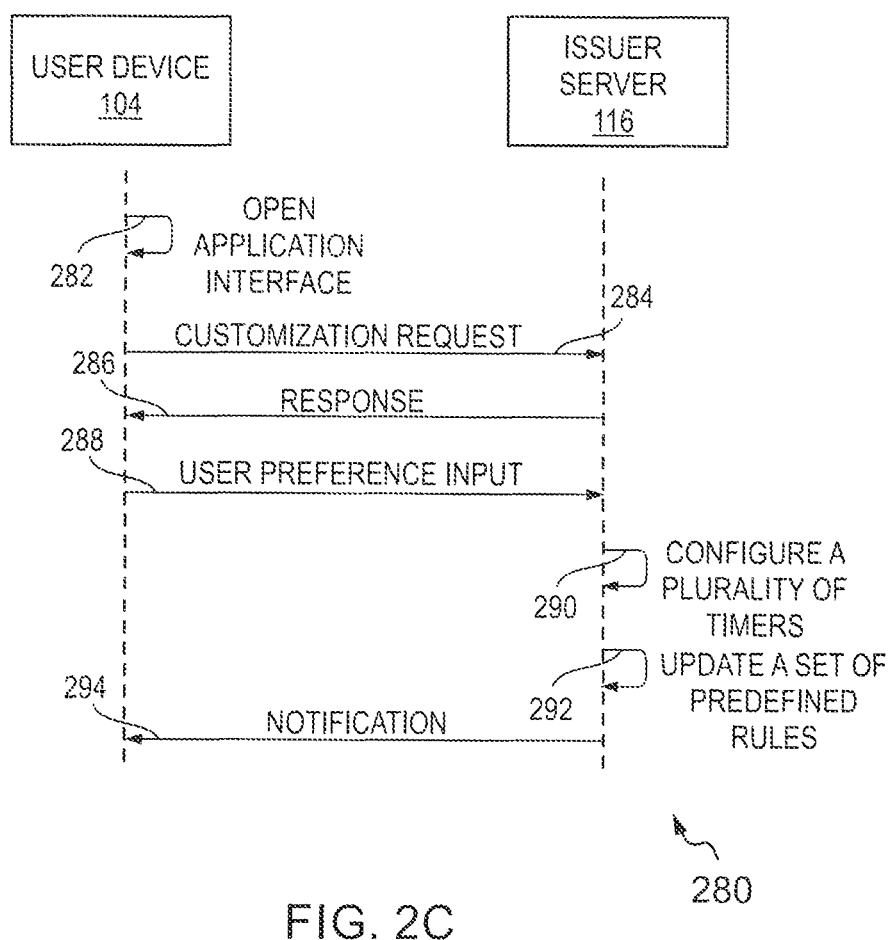
FIG. 2C represents a sequence flow diagram of customizing a plurality of timers based on a user preference input provided by a user for an authentication option, in accordance with an example embodiment of the present disclosure.

FIG. 2C represents a sequence flow diagram 280 of customizing a plurality of timers based on a user preference input provided by the user 102 for an authentication option, in accordance with an example embodiment of the present disclosure. The set of predefined rules are adapted based on the plurality of timers after customization of the plurality of timers based on the user preference input.

At 282, the user 102 opens an application interface in the user device 104. The application interface may be an application interface provided by the issuer server 116. At 284, the user 102 sends a customization request to the issuer server 116 via the application interface. At 286, the issuer server 116 provides a response to the user 102. The response may include an access grant to the user 102 to provide user preference inputs for customizing the plurality of timers. For example, a UI may be provisioned to the user 102 for providing user preference inputs for configuring the plurality of timers. An example of customizing the plurality of timers is shown and explained with reference to FIG. 8.

At 288, the user 102 provides the user preference input for customizing the plurality of timers to the issuer server 116. For example, the user 102 may provide user preference input for configuring the plurality of timers such as, timer 1 of 30 seconds for a static password option, timer 2 of 1 minute for QR code based password option, timer 3 of 2 minutes 30 seconds for OTP option and timer 4 of 20 seconds for biometric based authentication of the payment transaction.

At 290, the plurality of timers is configured based on the user preference input. At 292, a set of predefined rules are updated according to the plurality of timers that were customized based on the user preference input. At 294, a notification is sent by the issuer server 116 to the user device 104.

In an example scenario, it may happen that the user 102 may override an authentication option by selecting an alternate authentication option from a remainder of the authentication options of the plurality of authentication options. In such a scenario, the timeout period is dynamically adapted based on the overriding and is explained with reference to FIG. 3.

Figure 3:
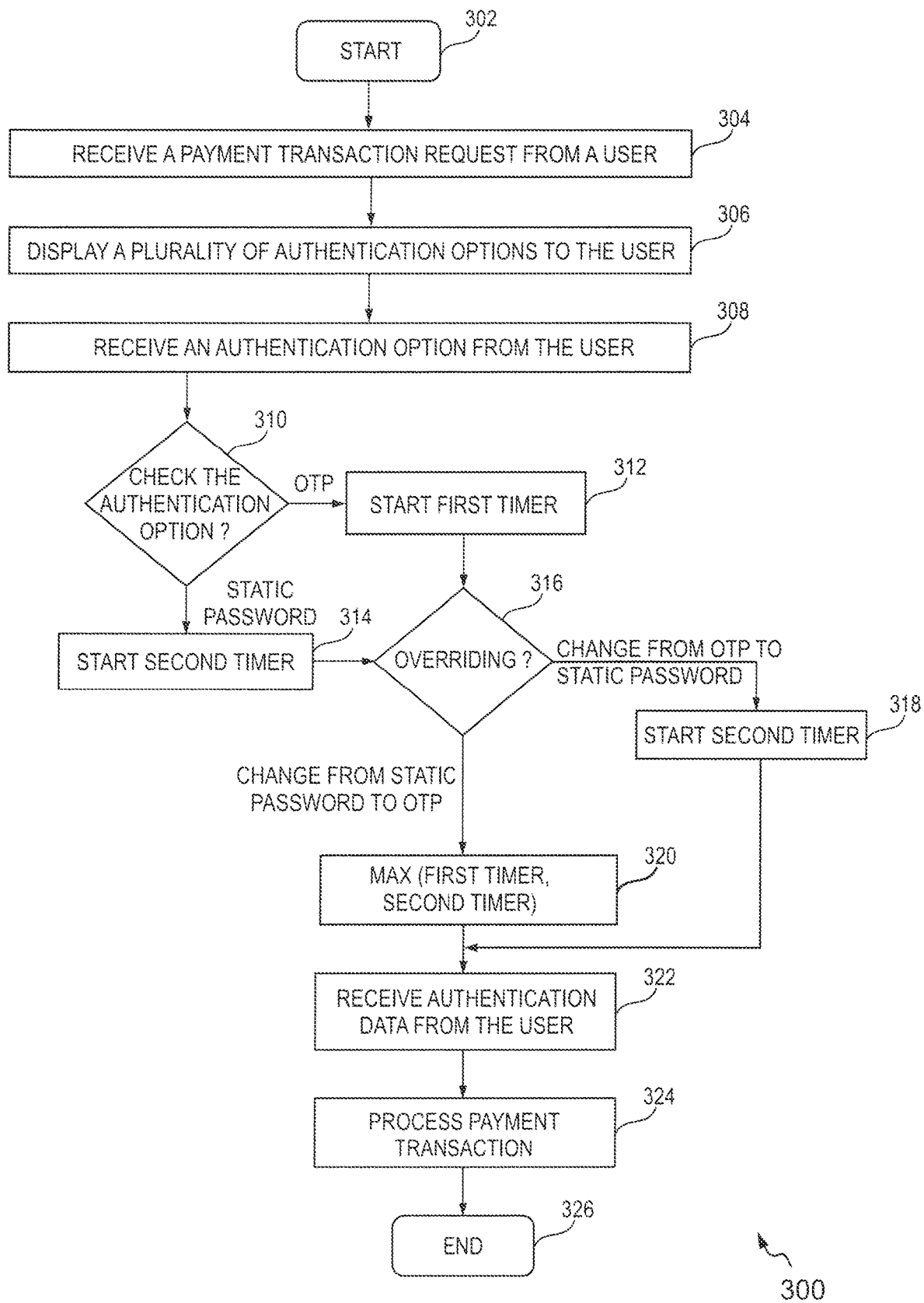
FIG. 3 represents a flowchart for determining a timeout period based on an authentication option selected by a user, in accordance with an example embodiment of the present disclosure.

FIG. 3 represents a flowchart of a method 300 for determining a timeout period based on an authentication option selected by the user 102, in accordance with an example embodiment of the present disclosure. The timeout period is determined by using a set of predefined rules that may include a plurality of timers. The set of predefined rules may be stored in a database, such as a rule database (see, FIG. 4). The rule database may be embodied in an issuer server, such as the issuer server 116 described with reference to FIG. 1. The plurality of timers may be configured either based on a user preference input or dynamically determined based on a plurality of usage analytics, historical authentication time and user profile information. In this example representation, the description is restricted to authentication options of OTP and static password for the sake of brevity. However, it should be noted that the plurality of authentication options may include authentication options other than the OTP option and the static password option.

At 302, the method 300 starts. At 304, the issuer server 116 receives a payment transaction request from the user 102. In one example embodiment, the payment transaction request includes a payment card information of the user 102, a payment amount for the goods/services and an option for authenticating the payment transaction on the issuer interface 201 provided the issuer server 116. In some example embodiments, the payment transaction request may further include one or more of a plurality of usage analytics data of the user 102 and a user profile information.

At 306, the issuer server 116 displays a plurality of authentication options to the user 102 after receiving the payment transaction request. In one example embodiment, the issuer server 116 may display to the user 102 the plurality of authentications options, such as an OTP option, a QR code option, a static password option and a biometric-based password option. The user 102 may select an authentication option from the plurality of authentication options. For instance, the user 102 may select the OTP option from the plurality of authentication options.

At 308, the issuer server 116 receives the authentication option from the user 102. At 310, the issuer server 116 checks type of the authentication option selected by the user 102. In one example embodiment, the issuer server 116 determines if the authentication option is the OTP option or the static password option.

At 312, if the authentication option is the OTP option then a first timer is initiated. At 314, if the authentication option is the static password option then a second timer is initiated. The first timer or the second timer is initiated by referring to the set of predefined rules.

At 316, the issuer server 116 checks if the authentication option selected by the user 102 is overridden by an alternate authentication option. In one example scenario, the user 102 may select the OTP option initially. However, it may happen that the user device 104 that will receive an OTP may be out of reach of the user 102. Hence, the user 102 may choose to authenticate the payment transaction using the static password option overriding the OTP option selected prior by the user 102.

At 318, if the user 102 changes from the OTP option to the static password option then the second timer is initiated. The issuer server 116 may look up the set of predefined rules to determine a timeout period if the OTP option is overridden by the static password option for authenticating the payment transaction. In this example scenario, the first timer of 2 minutes corresponding to the OTP option may have been initiated when the user 102 initially chose the OTP option and a time period say, 5 seconds may have elapsed before he swapped authentication option to the static password option. Now, the timer 2 for the static password option is initiated in the authentication session after the lapse of 5 seconds provided for the OTP option due to overriding.

At 320, if the user 102 changes from the static password option to the OTP option then a maximum between the first timer and the second timer is determined. For example, timer 1 for OTP option is 2 minutes and timer 2 for static password is 30 seconds. As the user 102 swaps from the static password option to the OTP option, a maximum timeout period that is determined from the timers 1 and 2 is the timeout period for the authentication session. It shall be noted that dynamic adaptation of the timeout period for the authentication session when the user 102 overrides an authentication option with an alternate authentication option is determined based on the predefined set of rules. At 322, the issuer server 116 receives the authentication data provided by the user 102. According to the authentication option selected, the user 102 provides an authentication data to the issuer server 116.

At 324, the issuer server 116 processes the payment transaction. The authentication data provided by the user 102 and the payment transaction are authenticated by the issuer server 116. After authenticating the payment transaction, the issuer server 116 checks availability of a balance in an issuer account of the user 102 and debits the payment amount for the goods/services purchased from the merchant via the merchant interface 106. The payment transaction is settled between the acquirer server 112 and the issuer server 116 by the payment server 114. At 326, the method 300 ends.

Figures 4, 5:
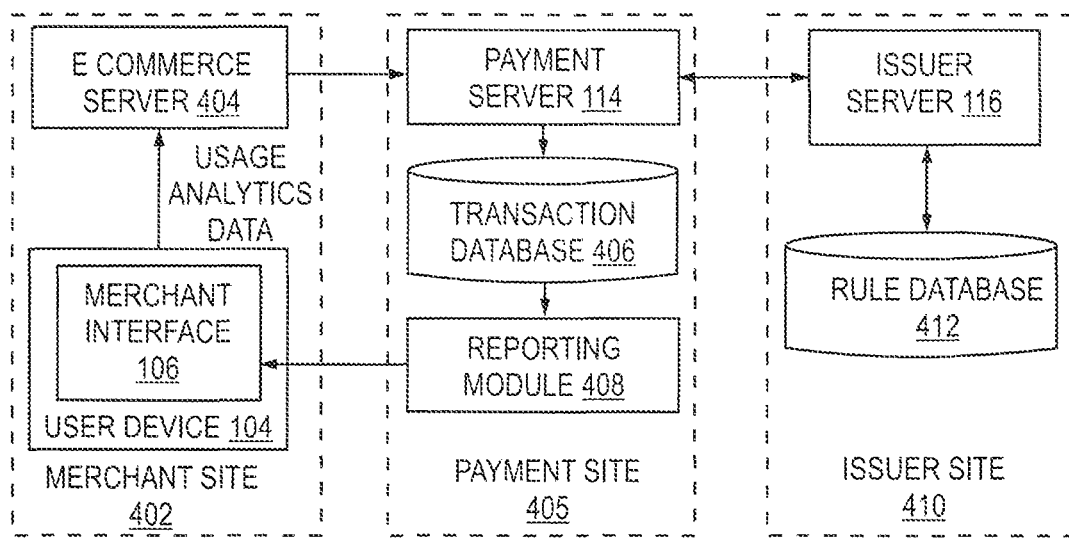
FIG. 4 illustrates a block diagram representation of sending a plurality of usage analytics data collected from a user device by a merchant site to a payment server via a payment site, in accordance with an example embodiment of the present disclosure.
FIG. 5 illustrates a schematic representation of a table including user profile information of a plurality of users maintained at a server system, in accordance with an example embodiment of the present disclosure.

One schematic block diagram representation of systems 400, involved in payment processing using dynamic adapting of the timeout period is shown in FIG. 4. A merchant site 402 includes an e-commerce server 404 that interacts with the merchant interface 106 accessed in the user device 104. With a prior permission from the user 102, the merchant interface 106, through suitable plug-ins or similar techniques, provides the usage analytics data to the e-commerce server 404. Also, the payment transaction request is provided to the e-commerce server 404. A payment site 405 includes the payment server 114 which processes the payment transaction. A transaction database 406 stores the user profile related information and historical usage analytics data associated with historical payment transactions performed by the user 102.

An issuer site 410 shown in FIG. 4, includes the issuer server 116 and a rule database 412. Once the payment gateway 110 redirects the user 102 from the merchant interface 106 to the issuer interface 201, the issuer server 116 presents the issuer interface 201 onto the user device 104 via a reporting module 408. Further, the issuer server 116 facilitates presentation of an option to the user 102 to select an authentication option from among a plurality of authentication options. The issuer server 116 accesses the rule database 412 to calculate an appropriate timeout period as per the selection of the authentication option by the user 102. The rule database 412 includes many rules for calculating the timeout periods. For instance, a rule may include providing weights to different attributes of user analytics data and the current selection of the authentication option and calculating a weighted timeout period. Another rule may include returning timeout periods purely based on the authentication options.

FIG. 5 illustrates a table 500 including user profile information of a plurality of users maintained at a server system, in accordance with an example embodiment of the present disclosure. In an embodiment, the table 500 may be maintained at the payment server 114. The payment server 114 on receiving a payment transaction request from the merchant interface 106 for a payment transaction initiated by the user 102 may look up the table 500 to determine historical authentication time of the user 102 associated with a payment card provided by the user 102 on the merchant interface 106 for authenticating payment transactions.

As seen in FIG. 5, the table 500 includes a set of historical authentication times of the user 102. In a non-limiting example, the historical authentication time of the user 102 may include an authentication time period for the last five payment transactions performed by the user 102 for each of the authentication option, for example, OTP option and the static password option. An average authentication time may be determined for each authentication option based on the authentication time period for the past five payment transactions. It shall be noted that the table 500 may include multiple such sub-tables and each table may have more or less columns and rows than depicted in FIG. 5. The table 500 shown in FIG. 5 is exemplary and only provided for the purposes of explanation.

The table 500 includes columns representing a user name field 502, an authentication option field 504, authentication time for last five transactions field 506 and an average authentication time field 508. As an example, a row 510 depicts a user named 'John Lewis' with information, such as authentication option selected by the user 102 for a payment transaction, authentication time information and an average time determined based on the past five payment transactions performed using a corresponding authentication option, say, the OTP option. The row 510 under a column, the authentication option field 504 is sub-divided into a plurality of authentication options. The plurality of authentication options may include an OTP option, a static password option, a QR code option and a biometric-based password option. However, for simplification, only the OTP option and the static password options are shown in the table 500. Each row indicating an authentication option, say the OTP option, may further be sub-divided to reflect the authentication time using the OTP option for the last five transactions in the authentication time for last five transactions field 506. The average authentication time, determined based on the authentication time availed for the last five payment transactions, is represented under a column, the average authentication time field 508.

FIG. 6 illustrates a table 600 depicting a plurality of usage analytics data of the user 102 collected from historical payment transactions and maintained at the server system, in accordance with an example embodiment of the present disclosure. The usage analytics data of the user 102 is collected via any merchant interface that the user 102 employs to purchase products online and make payment transactions that are authenticated at the issuer server 116. The usage analytics data collected from the user device 104 or any other electronic device used by the user 102 for the payment transaction are stored and maintained at the table 600. The table 600 may be maintained at the payment server 114 or the issuer server 116. The usage analytics collected from the historical payment transactions may be used to dynamically determine a timeout period for a current authentication session along with the authentication option selected by the user 102 for authenticating a current payment transaction.

As seen in FIG. 6, the table 600 includes the usage analytics data of the user 102. The usage analytics data may include data, such as user device type, operating system of the user device 104, web browser used by the user 102 for making payment transactions, typing speed of the user 102, authentication option selected and an average time. It shall be noted that the table 600 may include multiple such tables and each table may have more or less columns and rows than depicted in FIG. 6. The table 600 shown in FIG. 6 is exemplarily depicted for a user and only provided for the purposes of explanation.

The table 600 includes columns representing a user name field 602, a user device field 604, an operating system field 606, a web browser field 608, a typing speed field 610, an authentication option field 612 and an average time field 614. As an example, a row 616 depicts a user named 'John Lewis' with the information, such as type of user device, operating system of the user device, web browser information, typing speed of the user, authentication option selected by the user and average time taken. The row 616 under a column, the user device field 604, is sub-divided based on different user devices used by the user for past payment transactions (also referred to as 'historical payment transactions'). For example, the user may use user devices, such as a tablet, a laptop or a mobile phone for purchasing goods/services via different merchant interfaces and initiate payment transactions for the goods/services. The row 616 under a column, the operating system field 606, is sub-divided based on different operating systems in each of the user devices. As seen in FIG. 6, under the column of the operating system field 606, the operating systems corresponding to each user device includes a Windows OS, a Linux OS and Android OS. The row 616 under a column, the web browser field 608, is sub-divided based on different types of web browsers, such as Mozilla Firefox, Google Chrome, Opera Mini, etc. The typing speed (words per minute) of the user is depicted under the typing speed field 610. Likewise, the row 616 under a column, the authentication option field 612, may be sub-divided based on a plurality of authentication options. As seen in FIG. 6, the row 616 under the authentication option field 612, an OTP option and a static password option are shown as an exemplary. The average time taken is depicted in the average time field 614.

As an example, the user 'JOHN LEWIS' employing a user device, 'TABLET with an operating system of 'WINDOWS' accessing the merchant interface via a web browser 'MOZILLA FIREFOX' has a typing speed of 80-85 words per minute. The user 'JOHN LEWIS' avails an average time of 2 minutes 55 seconds when exercising the OTP option for authenticating payment transactions and an average time of 30 seconds when authenticating payment transactions using a static password.

FIG. 7 shows a table 700 depicting a set of predefined rules for determining a timeout period of an authentication session, in accordance with an example embodiment of the present disclosure. The table 700 is hosted and managed at the issuer server 116. The issuer server 116 on receiving an authentication option for authenticating a payment transaction, looks up the table 700 comprising a set of predefined rules for determining the timeout period for an authentication session to authenticate payment transactions. Each predefined rule corresponds to one or more authentication options of a plurality of authentication options, such as, an OTP password option, a static password option, a biometric password option, a QR code option. As seen in FIG. 7, the table 700 includes a plurality of rules for determining a timeout period based on an authentication option selected by the user 102. It shall be noted that the table 700 may include multiple such tables and each table may have more or less rules than those depicted in FIG. 7. The table 700 shown in FIG. 7 is exemplary and only provided for the purposes of explanation.

As seen in FIG. 7, the table 700 includes a set of predefined rules represented by rows 708, 710 and 712. Each rule corresponds to one or more authentication options of the plurality of authentication options. In the table 700, columns include a rule reference field 702, an authentication option field 704, and a timeout period field 706. A row 708 represents that for an authentication option—'OTP', rule defined is 'RULE 1' and timeout period for the OTP option is a 'TIMER 1'. Likewise, each row represents rules and timers for the authentication options. The rules in the table 700 may be updated based on user preference input to configure the plurality of timers provided by the user 102. The plurality of timers may be preset or may be configured based on the user preference input.

In one example embodiment, the issuer server 116 may provide an application interface that causes display of one or more user interfaces (UIs) for receiving a user preference input. The user preference input may be used for configuring a plurality of timers. An example UI displayed to the user 102 for receiving the user preference input is described with reference to FIG. 8.

Figure 8:
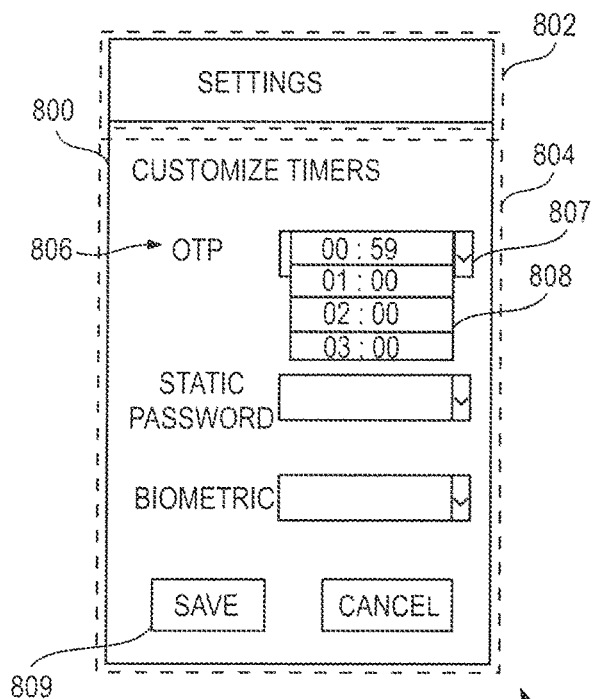
FIG. 8 shows an example representation of a UI displayed to a user on a display screen of a user device by an application interface for customizing a plurality of timers based on a user preference input, in accordance with an example embodiment of the present disclosure.

Referring now to FIG. 8, an example representation of a UI 800 displayed to the user 102 on a display screen of the user device 104 by an application interface 810 for configuring a plurality of timers based on a user preference input, is shown in accordance with an example embodiment of the present disclosure. In an example scenario, the application interface 810 may be hosted and managed by the issuer server 116 (shown in FIG. 1). It shall be noted the UI 800 as shown in FIG. 8 is provided as an exemplary representation for explanation purposes.

The UI 800 is depicted to include a header portion 802 and a content portion 804. The header portion 802 is depicted to exemplarily display a title associated with text 'SETTINGS'. The content portion 804 of the UI 800 is depicted to display a content name titled as 'CUSTOMIZE TIMERS'. The content portion 804 of the UI 800 is further depicted to display fields for a plurality of authentication options shown as 'OTP', 'STATIC PASSWORD' and 'BIOMETRIC'. Each of the fields depicting an authentication option have an associated text box that are configured to receive the user preference input for configuring a timer associated with the authentication option. The textbox may be a drop down menu and the user may scroll to select a timeout period for a corresponding authentication option. As shown in FIG. 8, for an authentication option 806 associated with text "OTP", a textbox 807 appears beside the authentication option 806. The textbox 807 has a drop down menu 808 displaying a list of timeout periods/timers. In another embodiment, the user can configure timers and subsequently, the user may be presented with a UI for assigning timers to various authentication options. Likewise, for other authentication options the timer/timeout period may be selected and configured. After selecting a timeout period of 2 minutes from the drop down menu 808, the user preference input can be saved by clicking on a tab 809 associated with text 'SAVE'. The plurality of timers configured based on the user preference input may be stored at the issuer server 116. A rule database (e.g., the rule database 412 shown in FIG. 4) storing a set of predefined rules is updated accordingly.

In one example scenario, an option may be presented to the user 102 provisioning an option for the user 102 to authenticate the payment transaction at the issuer interface 201 hosted and managed by the issuer server 116. An example UI displayed to the user 102 with the option for routing to the issuer interface 201 is described with reference to FIG. 9.

Figure 9:
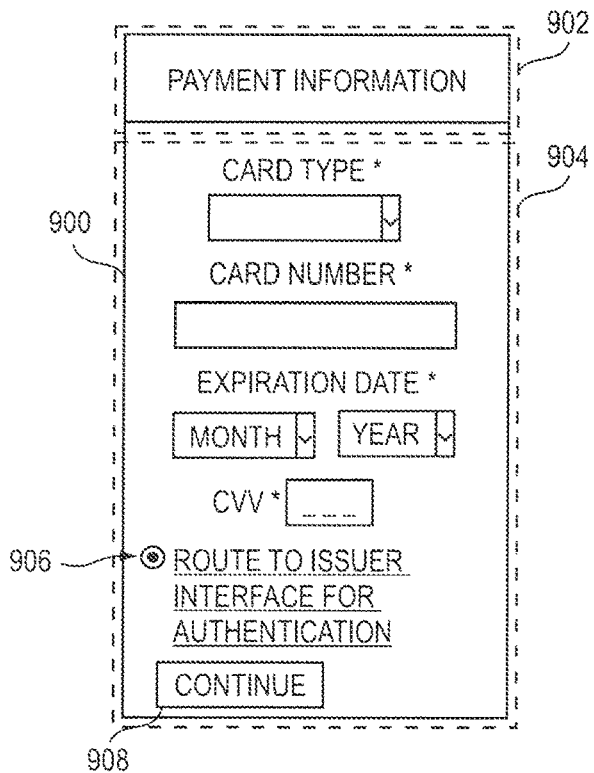
FIG. 9 illustrates an example representation of a UI displayed to a user on a display screen of a user device by a merchant interface for receiving payment card information of the user for a payment transaction, in accordance with an example embodiment of the present disclosure.

Referring now to FIG. 9, an example representation of a UI 900 displayed to the user 102 on a display screen of the user device 104 by the merchant interface 106 for receiving payment card information of the user 102 for a payment transaction is shown in accordance with an example embodiment of the present disclosure. It shall be noted the UI 900 as shown in FIG. 9 is provided as an exemplary representation for explanation purpose only, and actual UI may be different that the illustrated representation.

The UI 900 is depicted to include a header portion 902 and a content portion 904. The header portion 902 is depicted to exemplarily display a title associated with text 'PAYMENT INFORMATION'. The content portion 904 of the UI 900 is depicted to display data fields for providing a payment card information of the user 102. The data fields for the payment card information are shown as 'CARD TYPE', 'CARD NUMBER', 'EXPIRATION DATE' and 'CVV'. As shown in FIG. 9, the content portion 904 of the UI 900 is further depicted to include an option 906 associated with text "ROUTE TO ISSUER INTERFACE FOR AUTHENTICATION". The option 906 provisions the user 102, a secure way of authenticating the payment transaction using any authentication option at the issuer interface 201. It shall be noted that embodiments of the present disclosure are functional only when the user 102 chooses to authenticate the payment transaction at the issuer interface 201. The content portion 904 includes a tab 908 associated with text "CONTINUE" and the payment transaction is redirected to the issuer interface 201 when the user 102 provides a selection input on the option 906 and then clicks on the tab 908.

Figure 10A:
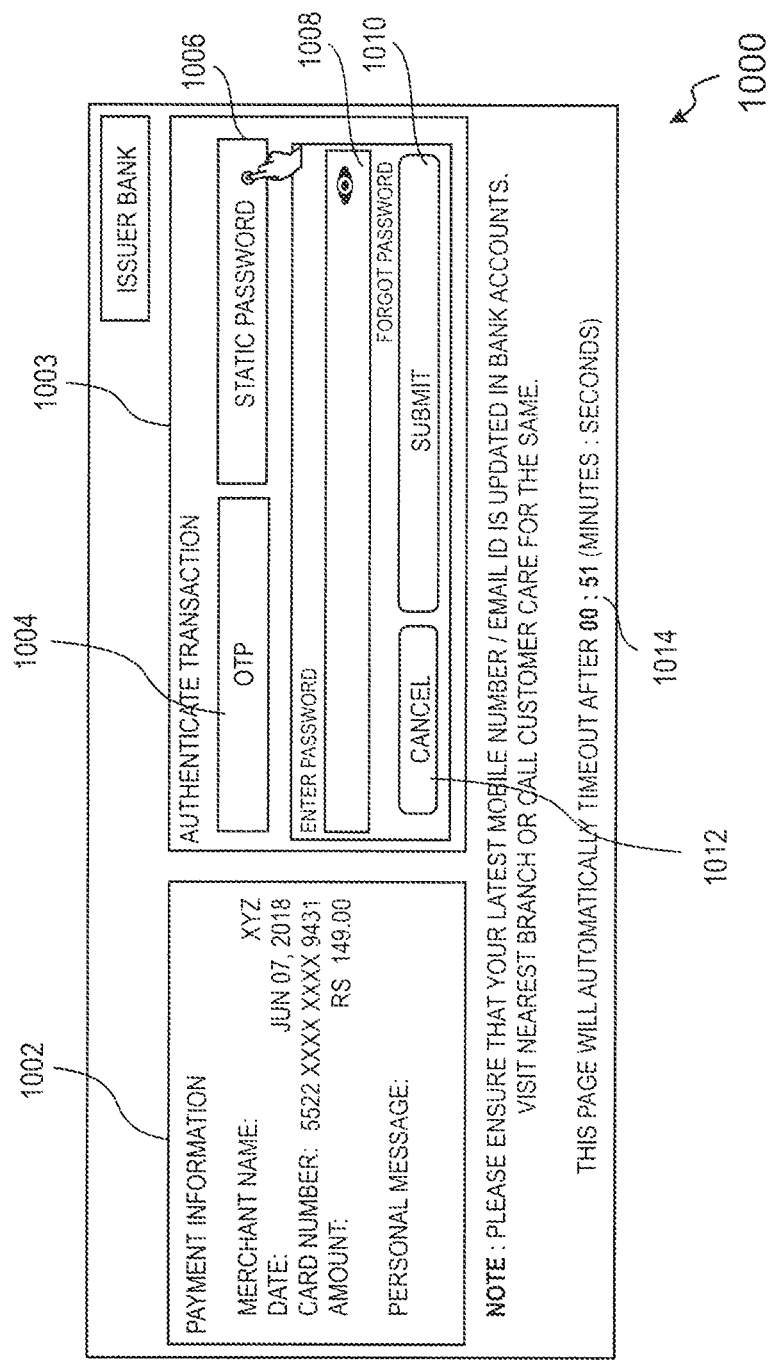
FIG. 10A illustrates an example representation of a UI displayed to a user on a display screen of a user device by an issuer interface depicting a timeout period for an authentication session based on a static password option selected by the user, in accordance with an example embodiment of the present disclosure.

Referring now to FIG. 10A, an example representation of a UI 1000 is displayed to the user 102 on a display screen of the user device 104. The UI 1000 is displayed by the issuer interface 201 depicting a timeout period 1014 for an authentication session based on an authentication option selected by the user 102. The UI 1000 is depicted to display payment details for the merchant under a section 1002 titled "PAYMENT INFORMATION". The payment details include details such as, merchant name, date of the payment transaction, payment card number of the user 102 and a payment amount for the goods/services availed by the user 102 from the merchant.

The UI 1000 includes a section 1003 titled "AUTHENTICATE TRANSACTION" displaying authentication options and a textbox 1008 for providing authentication data corresponding to the authentication option selected by the user 102. In this example representation, the UI 1000 display authentication options 1004, 1006 associated with text "OTP" and "STATIC PASSWORD", respectively. It shall be noted an OTP option and a static password option are shown in the UI 1000 as authentication options to authenticate a payment transaction. However, there may be other authentication options, such as a QR code option, a biometric-based password option and the like.

When the user selects an authentication option from the authentication options 1004, 1006, the timeout period 1014 is dynamically displayed corresponding to the authentication option selected by the user. In this example representation, the authentication option 1006 selected by the user is sent to the issuer server 116 and the issuer server 116 dynamically determines the timeout period 1014 for the authentication session based on one or more of the authentication option selected by the user, a user profile information, a plurality of usage analytics data and a set of predefined rules. The timeout period 1014 defines a duration of the authentication session for the user to provide authentication data corresponding to the authentication option 1006. The user can click on a tab 1010 associated with text "SUBMIT" to authenticate the payment transaction based on the authentication data provided in the textbox 1008 or click on a tab 1012 associated with text "CANCEL" to decline further processing of the payment transaction.

The timeout period 1014 is a timer that automatically starts to count down on start of the authentication session. In this example representation, the timer is for 1 minute for authenticating the payment transaction using the authentication option 1006 and the timeout period 1014 displays 00:51 minutes: seconds indicating that the timer starts a count down upon start of the authentication session. The authentication session expires either when the user provides the authentication data and a selection input on the tab 1010 or when the timeout period expires.

Figure 10B:
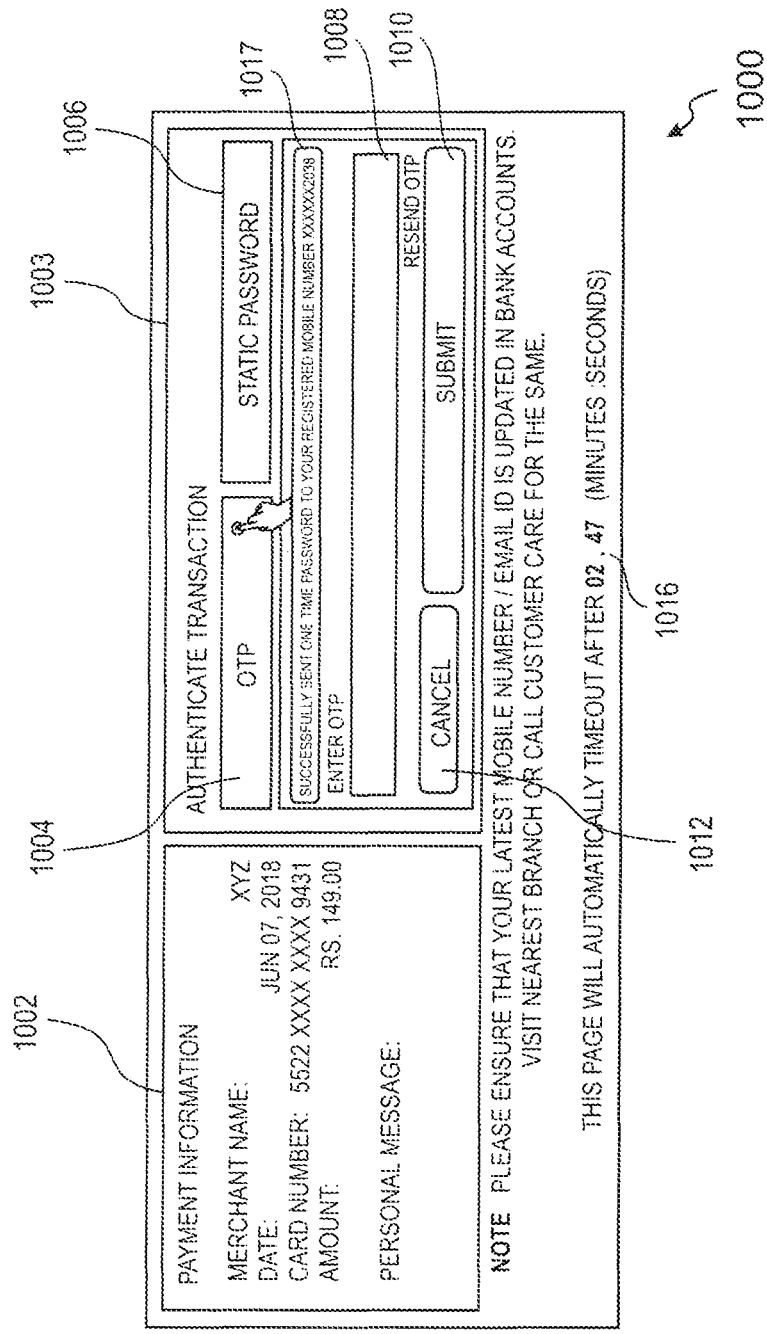
FIG. 10B illustrates an example representation of a UI displayed to a user on a display screen of a user device by the merchant interface depicting a timeout period for an authentication session based a One-Time Password (OTP) option selected by the user, in accordance with an example embodiment of the present disclosure.

Referring to FIG. 10B, an example representation of the UI 1000 displayed to a user on a display screen of a user device by the issuer interface 201 is illustrated. A timeout period 1014 is depicted for an authentication session based on an authentication option 1004 selected by the user. As shown in FIG. 10B, when the user 102 selects the authentication option 1004, a timeout period 1014 with a timer of '02:47' is initiated. It is noted the timeout period 1014 differs from the timeout period 1014 (shown in FIG. 10A) based on the authentication option selected by the user 102. After selecting the authentication option 1004, an OTP is generated and sent to a contact number or email of the user 102. Once the OTP is sent, a notification message 1017 is displayed in the UI 1000, as shown in FIG. 10B.

In one example scenario, the user 102 may switch from the authentication option 1004 to the authentication option 1006. For instance, the user 102 may switch from an OTP option 1004 to a static password option 1006 when the user device 104 is out of reach. In such scenario, the timeout period corresponding to the static password option 1006 will be initiated. In another example scenario, the user 102 may switch from the static password option 1006 to the OTP option 1004. In such scenario, a maximum of the timeout period 1014 and the timeout period 1014 is determined. For instance, timeout period 1014 may be greater than the timeout period 1014 and the timeout 1016 may be selected. The timeout period 1014 is initiated when the user 102 switches from the static password option 1006 to the OTP option 1004. A timeout period to authenticate the payment transaction is dynamically adapted based on the authentication option selected by the user 102, a set of predefined rules and one or more of a plurality of timers, a plurality of usage analytics data and a user profile information.

Figure 11A:
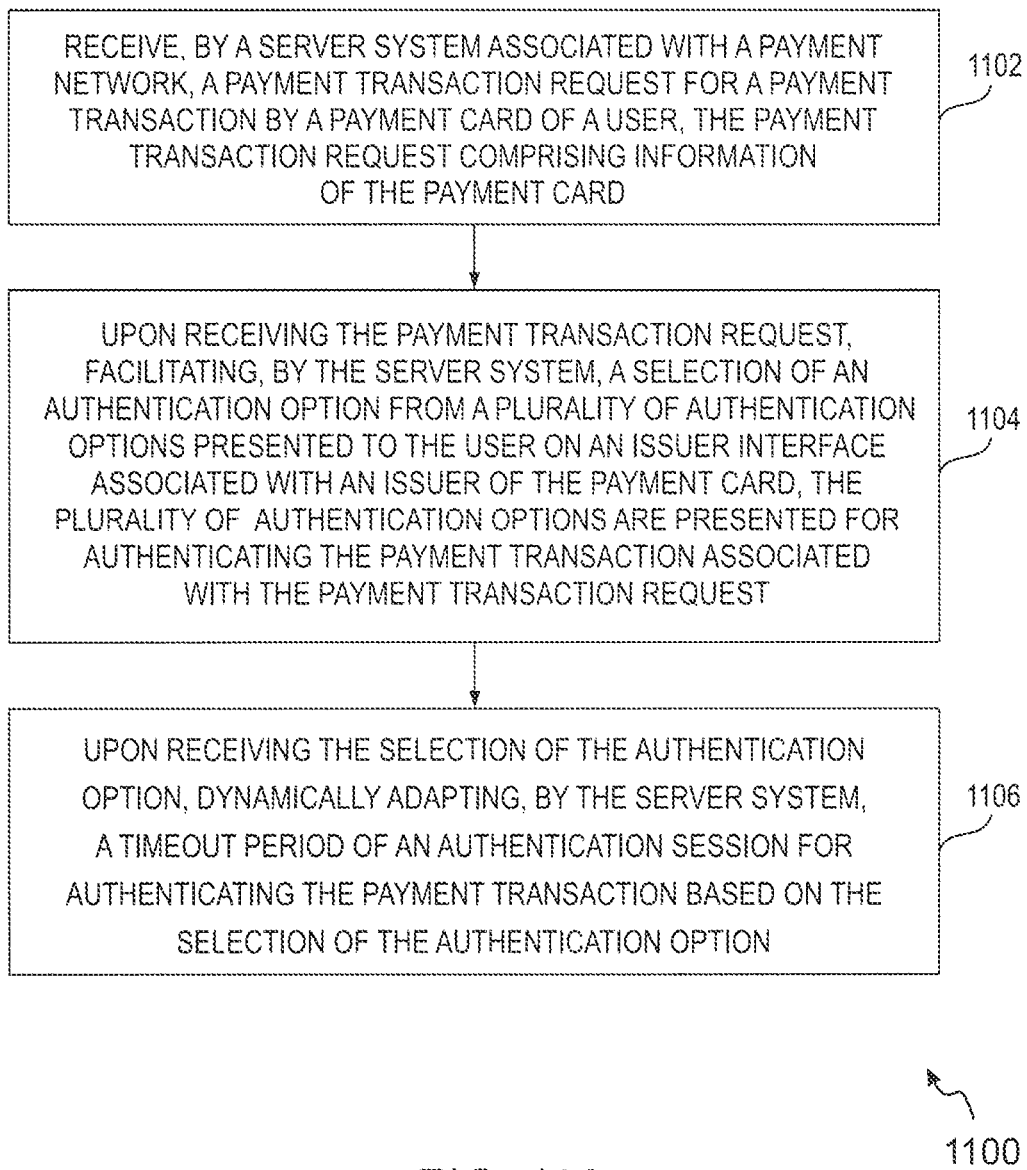
FIG. 11A illustrates a flow diagram depicting a method for dynamically adapting a timeout period of an authentication session for authenticating a payment transaction based on an authentication option, in accordance with an example embodiment of the present disclosure.

FIG. 11A illustrates a flow diagram depicting a method 1110 for dynamically adapting a timeout period of an authentication session for authenticating a payment transaction based on an authentication option, in accordance with an example embodiment of the present disclosure. The method 1100 depicted in the flow diagram may be executed by a server system, for example, the issuer server 116. Operations of the flow diagram 1100, and combinations of operation in the flow diagram 1100, may be implemented by, for example, hardware, firmware, a processor, circuitry and/or a different device associated with the execution of software that includes one or more computer program instructions. The operations of the method 1100 are described herein with help of the issuer server 116. It is noted that the operations of the method 1100 can be described and/or practiced by using a system other than the issuer server 116 such as, the acquirer server 112 or the payment server 114. The method 1100 starts at operation 1102.

At operation 1102, the method 1100 includes receiving, by a server system associated with a payment network, a payment transaction request for a payment transaction by a payment card of a user. The payment transaction request includes information of the payment card for processing the payment transaction. In an example embodiment, a user may purchase from a merchant via a merchant interface. After purchasing, the user may be redirected to a payment page in the merchant interface for making a payment transaction to the merchant for the goods/services purchased via the merchant interface. The user provides the payment card information for making the payment transaction. In the payment page, the user may be presented with an option to authenticate the payment transaction at an issuer interface (see, FIG. 9). The issuer interface 201 is hosted and managed by the issuer server.

At operation 1104, the method 1100 includes upon receiving the payment transaction request, facilitating, by the server system, a selection of an authentication option from a plurality of authentication options presented to a user on the issuer interface associated with an issuer of the payment card. The plurality of authentication options is presented for authenticating the payment transaction associated with the payment transaction request. In one example embodiment, the issuer server may provision the plurality of authentication options such as but not limited to a One-Time Password (OTP) option, a Quick-Response (QR) code option, a static password option and a biometric-based password option for the user to authenticate the payment transaction at the issuer interface. The user may select an authentication option from the plurality of authentication options. For example, the user may select the OTP option from the plurality of authentication options.

At operation 1106, the method 1100 includes upon receiving the selection of the authentication option, dynamically adapting, by the server system, a timeout period of an authentication session for authenticating the payment transaction based on the selection of the authentication option. For example, a timer 1 of 30 seconds defines the timeout period of the authentication session when the user chooses to authenticate using the static password option and a timer 2 of 2 minutes defines the timeout period of the authentication session for the OTP password option. In one example embodiment, the timeout period is determined based on the authentication option and a set of predefined rules. The set of predefined rules may be stored in as a table maintained at the server system. Each predefined rule of the set of predefined rules are defined for one or more authentication options. The predefined rules use a rule base and a plurality of timers define the timeout period based on the choice of authentication option. Some examples of a predefined rule would be as follows:

If authentication_option=static password, then activate timer 1
If authentication_option=OTP, then activate timer 2
If authentication_option_swap_static_to_OTP, then activate max (timer 1, timer 2)
If authentication_option_swap_OTP_to_static, then activate timer 1.

In an embodiment, the timeout period defined by a plurality of timers may be customized based on a user preference input. Alternatively, the plurality of timers may be preset or fixed by developers of the set of predefined rules. In some example embodiments, the timeout period is dynamically adapted based on the authentication option, a plurality of usage analytics data and a user profile information. The dynamic adaptation of the timeout period is governed by the set of predefined rules. The merchant interface may collect and send the plurality of usage analytics data to the issuer server. The plurality of usage analytics data may include one or more of a type of user device, a web browser information and a typing speed of the user. Additionally or optionally, historical usage analytics data stored at the server system may also be used for determining the timeout period. The user profile information of the user includes historical authentication time for a set of payment transactions performed by the user, for example, past 5 transactions performed using the payment card of the user using each authentication option of the plurality of authentication options. The user profile information and historical usage analytics data may be stored as tables at the server system and are accessed by the issuer server when a payment transaction is initiated using a corresponding payment card of the user. In one example scenario, the authentication option (e.g., QR code option) selected by the user may be overridden by an alternate authentication option (e.g., static password option) for authenticating the payment transaction. The alternate authentication option (static password option) is selected from a remainder of the plurality of authentication options. In such cases, the server system looks up the set of predefined rules for determining a rule that relates to overriding from the authentication option (QR code option) to the alternate authentication option (static password option) and accordingly updates the timeout period for the authentication session.

The sequence of operations of the method 1100 need not be necessarily executed in the same order as they are presented. Further, one or more operations may be grouped together and performed in form of a single step, or one operation may have several sub-steps that may be performed in parallel or in sequential manner.

Figure 11B:
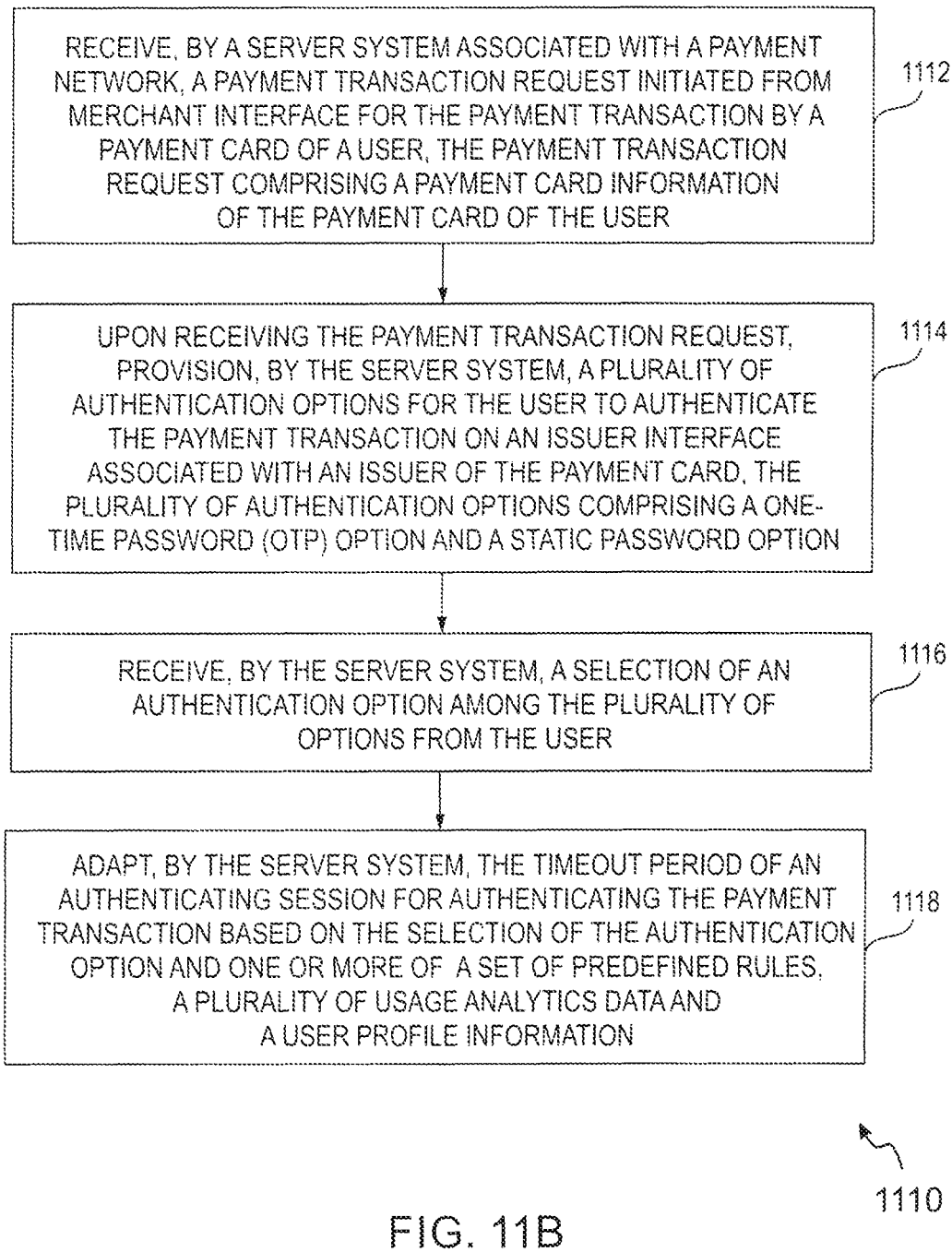
FIG. 11B illustrates a flow diagram depicting a method for dynamically adapting a timeout period of an authentication session for authenticating a payment transaction based on an authentication option, in accordance with another example embodiment of the present disclosure.

FIG. 11B illustrates a flow diagram depicting a method 1110 for dynamically adapting a timeout period of an authentication session for authenticating a payment transaction based on an authentication option, in accordance with another example embodiment of the present disclosure. The method 1110 depicted in the flow diagram may be executed by, for example, the issuer server 116. Operations of the flow diagram 1110, and combinations of operation in the flow diagram 1110, may be implemented by, for example, hardware, firmware, a processor, circuitry and/or a different device associated with the execution of software that includes one or more computer program instructions. The operations of the method 1110 are described herein with help of the issuer server 116. It is noted that the operations of the method 1110 can be described and/or practiced by using a system other than the acquirer server 112 or the payment server 114. The method 1110 starts at operation 1112.

At operation 1112, the method 1110 includes receiving, by a server system associated with a payment network, a payment transaction request initiated from a merchant interface for a payment transaction by a payment card of a user. The payment transaction request includes a payment card information of the payment card of the user.

At operation 1114, the method 1110 includes upon receiving the payment transaction request, provisioning, by the server system, a plurality of authentication options for the user to authenticate the payment transaction on an issuer interface associated with an issuer of the payment card. The plurality of authentication options comprising an OTP option and a static password option.

At operation 1116, the method 1110 includes receiving, by the server system, a selection of an authentication option among the plurality of options from the user.

At operation 1118, the method 1110 includes adapting, by the server system, a timeout period of an authentication session for authenticating the payment transaction based on the selection of the authentication option and one or more of: (1) a set of predefined rules, (2) a plurality of usage analytics data and (3) a user profile information.

Figure 12:
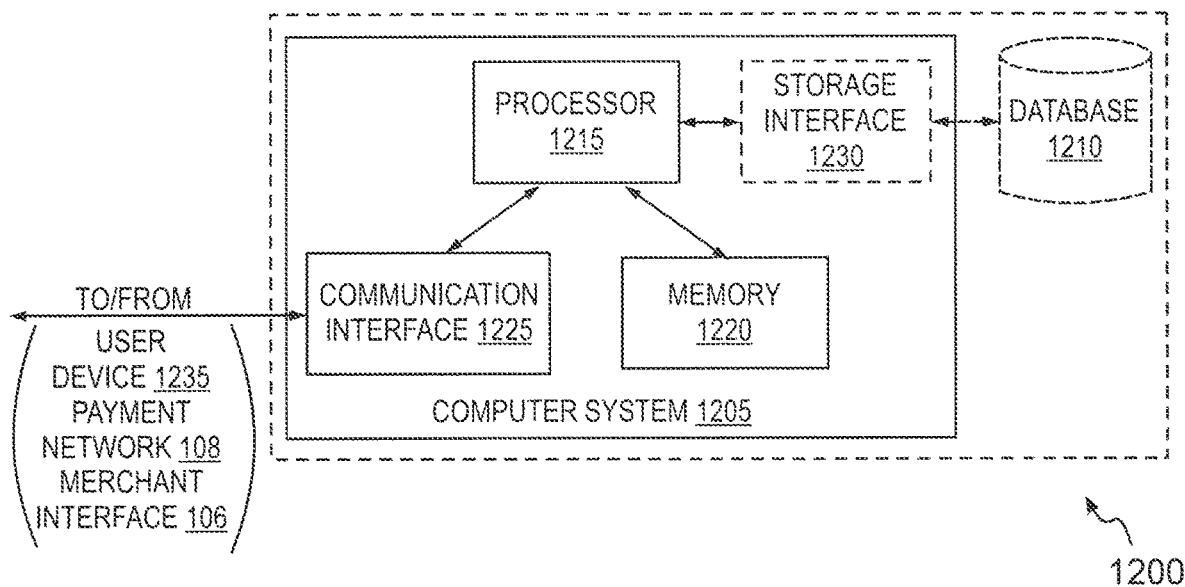
FIG. 12 is a simplified block diagram of a server system for dynamically adapting a timeout period of an authentication session for a payment transaction based on an authentication option, in accordance with an example embodiment of the present disclosure.

FIG. 12 is a simplified block diagram of a server system 1200 for dynamically adapting a timeout period of an authentication session for a payment transaction, in accordance with an embodiment of the present disclosure. Examples of the server system 1200 include, but not limited to, the acquirer server 112, the payment server 114 and the issuer server 116 illustrated in FIG. 1. The server system 1200 includes a computer system 1205 and a database 1210.

The computer system 1205 includes at least one processor 1215 for executing instructions. Instructions may be stored in, for example, but not limited to, a memory 1220. The processor 1215 may include one or more processing units (e.g., in a multi-core configuration).

The processor 1215 is operatively coupled to a communication interface 1225 such that the computer system 1205 is capable of communicating with a remote device such as a user device 1235 (e.g., the user device 104), the merchant interface 106 or communicates with any entity within the payment network 108. For example, the communication interface 1225 may receive a customization request from the user device 1235 for configuring a set of predefined rules based on a user preference input.

The processor 1215 may also be operatively coupled to the database 1210. The database 1210 is any computer-operated hardware suitable for storing and/or retrieving data, such as, but not limited to, transaction data generated as part of sales activities conducted over the bankcard network including data relating to merchants, account holders or customers, and purchases. The database 1210 may also store information related to a set of predefined rules, a plurality of usage analytics data and a user profile information. The database 1210 may also include instructions for settling transactions including merchant bank account information. The database 1210 may include multiple storage units such as hard disks and/or solid-state disks in a redundant array of inexpensive disks (RAID) configuration. The database 1210 may include a storage area network (SAN) and/or a network attached storage (NAS) system.

In some embodiments, the database 1210 is integrated within the computer system 1205. For example, the computer system 1205 may include one or more hard disk drives as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210.

The processor 1215 is configured to at least perform: receiving a payment transaction request from a merchant interface (e.g., the merchant interface 106 in FIG. 1), facilitating selection of an authentication option from a plurality of authentication options upon receiving the payment transaction request and dynamically adapting a timeout period of an authentication session for authenticating the payment transaction upon receiving the authentication option. The payment transaction request may include a payment information and a payment card information of a user. The processor 1215 may also be configured to notify the user device 1235 of the transaction status via the communication interface 1225.

Figure 13:
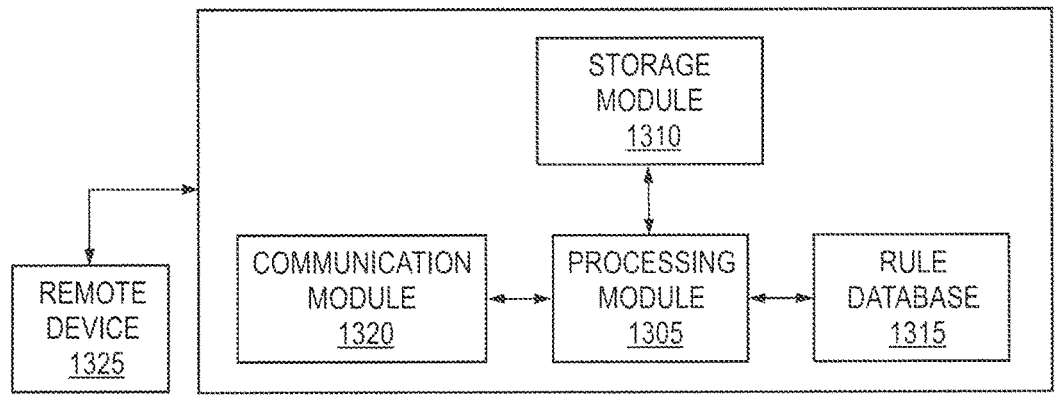
FIG. 13 is a simplified block diagram of an issuer server used for dynamically adapting a timeout period for authenticating a payment transaction based on an authentication option, in accordance with an example embodiment of the present disclosure.

FIG. 13 is a simplified block diagram of an issuer server 1300 used for dynamically adapting a timeout period for authenticating a payment transaction, in accordance with an example embodiment of the present disclosure. The issuer server 1300 is an example of the issuer server 116 of FIG. 1 or may be embodied in the issuer server 116. The issuer server 1300 is associated with an issuer bank/issuer, in which a user (e.g., the user 102) may have an account, which provides a payment card. The issuer server 1300 includes a processing module 1305 operatively coupled to a storage module 1310, a rule database 1315, and a communication module 1320. The components of the issuer server 1300 provided herein may not be exhaustive and that the issuer server 1300 may include more or fewer components than that of depicted in FIG. 13. Further, two or more components may be embodied in one single component, and/or one component may be configured using multiple sub-components to achieve the desired functionalities. Some components of the issuer server 1300 may be configured using hardware elements, software elements, firmware elements and/or a combination thereof.

The storage module 1310 is configured to store machine executable instructions to be accessed by the processing module 1305. Additionally, the storage module 1310 stores information related to, contact information of the user, bank account number, availability of funds in the account, payment card details, transaction details and/or the like. This information is retrieved by the processing module 1305 for validation of a payment transaction. In one example embodiment, the rule database 1315 may be embodied in the storage module 1310. In another embodiment, the rule database 1315 may be operatively coupled to the processing module 1305. The rule database 1315 may store a set of predefined rules for dynamically adapting a timeout period based on an authentication option, a plurality of usage analytics data and a user profile information. The predefined rules employ a plurality of timers for defining the timeout period of an authentication session. In some example embodiments, the plurality of timers can be modified based on a user preference input for configuring the plurality of timers. The set of predefined rules may be updated upon configuring the plurality of timers based on the user preference input.

The processing module 1305 is configured to communicate with one or more remote devices such as a remote device 1325 using the communication module 1320 over a network such as the payment network 108 of FIG. 1. The examples of the remote device 1325 include the user device 104, the acquirer server 112, the payment server 114 and an external database (not shown) or other computing systems of issuer and the payment network 108 and the like. The communication module 1320 is capable of facilitating such operative communication with the remote devices and cloud servers using API (Application Program Interface) calls. The communication module 1320 is configured to receive a payment transaction request from a merchant interface (e.g., the merchant interface 106) in the user device 104 via the payment network 108. The communication module 1320 is configured to receive a customization request from the user device 104 as well as send a response for the customization request via the payment network 108. The processing module 1305 receives a payment information, a payment card information and a merchant information from the merchant interface 106 in the remote device 1325 (i.e. the user device 104 or the payment server 114). In one embodiment, the processing module 1305 may facilitate a dedicated application interface capable of being installed on the user device 104. The user (e.g., the user 102) may be provide user preferences using the application interface on the user device 104. The user 102 may access the application interface using a web link as well, instead of having a need to install the application on the user device 104.

Figure 14:
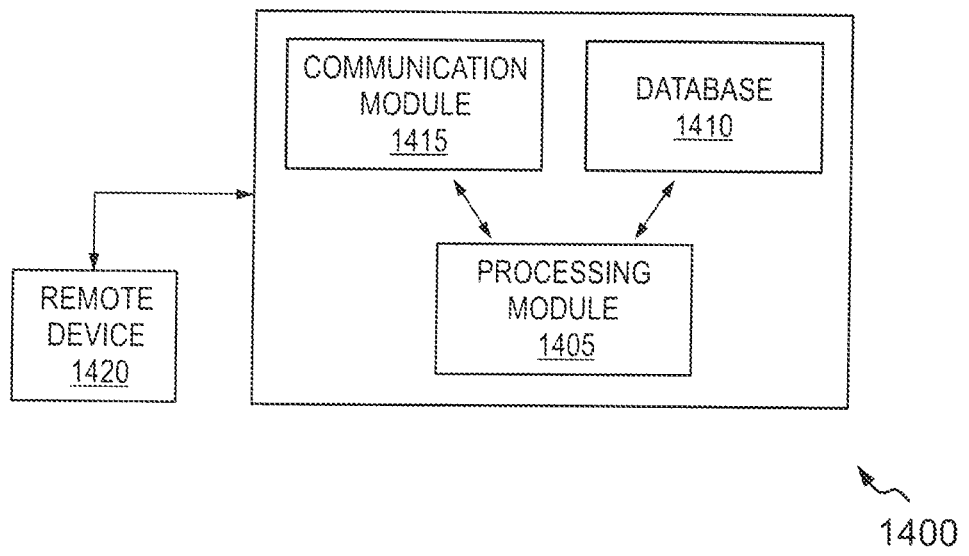
FIG. 14 is a simplified block diagram of an acquirer server used for facilitating payment transactions to a merchant, in accordance with an example embodiment of the present disclosure.

FIG. 14 is a simplified block diagram of an acquirer server 1400 used for facilitating payment transactions to a merchant, in accordance with an embodiment of the present disclosure. The acquirer server 1400 is associated with an acquirer bank, which may be associated with the merchant. The merchant may have established an account to accept payment for purchase of items from users. The acquirer server 1400 is an example of the acquirer server 112 of FIG. 1 or may be embodied in the acquirer server 112. Further, the acquirer server 1400 is configured to facilitate payment with the issuer server 1300 using a payment network, such as the payment network 108 of FIG. 1.

The acquirer server 1400 includes a processing module 1405 communicably coupled to a database 1410 and a communication module 1415. The components of the acquirer server 1400 provided herein may not be exhaustive, and that the acquirer server 1400 may include more or fewer components than that of depicted in FIG. 14. Further, two or more components may be embodied in one single component, and/or one component may be configured using multiple sub-components to achieve the desired functionalities. Some components of the acquirer server 1400 may be configured using hardware elements, software elements, firmware elements and/or a combination thereof.

The database 1410 includes data of one or more merchant parameters, such as, but not limited to, a merchant primary account number (PAN), a merchant name, a merchant ID (MID), a merchant category code (MCC), a merchant city, a merchant postal code, a merchant brand name, etc. used for processing transactions. The processing module 1405 is configured to use the MID or any other merchant parameter such as the merchant PAN to identify the merchant during the normal processing of payment transactions, refunds, adjustments, chargebacks, end-of-month fees, loyalty programs associated with the merchant and so forth. The processing module 1405 may be configured to store and update the merchant parameters in the database 1410 for later retrieval. In an embodiment, the communication module 1415 is capable of facilitating operative communication with a remote device 1420, such as, the user device 104 with the merchant interface 106. The communication module 1415 is configured to receive the payment transaction request from the merchant interface 106 in the remote device 1420 (e.g., the user device 104).

Figure 15:
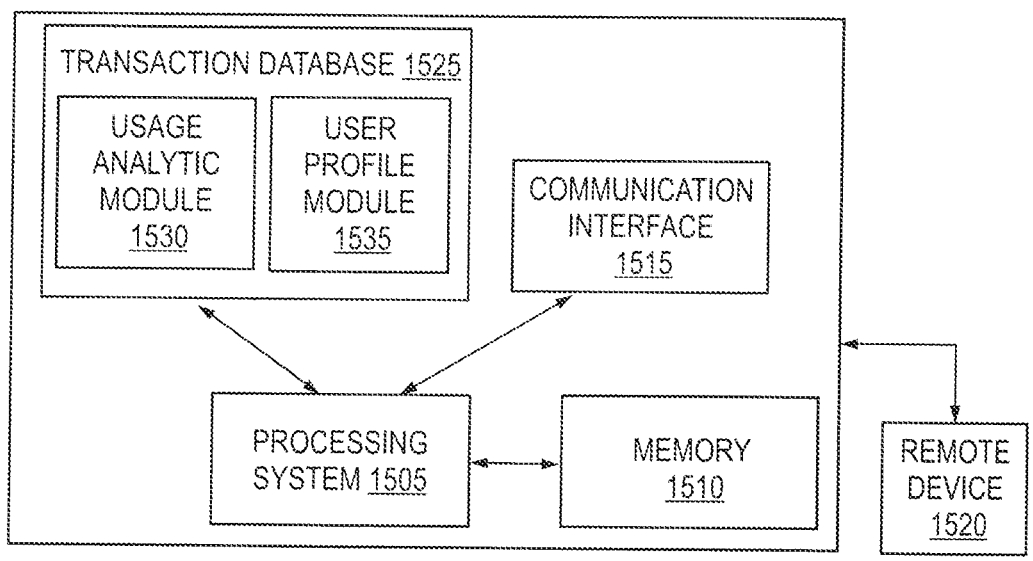
FIG. 15 is a simplified block diagram of a payment server used for dynamically adapting a timeout period for authenticating a payment transaction based on an authentication option, in accordance with an example embodiment of the present disclosure.

FIG. 15 is a simplified block diagram of a payment server 1500 used for facilitating payment transactions to a merchant, in accordance with an embodiment of the present disclosure. The payment server 1500 is an example of the payment server 114 of FIG. 1. The payment network 108 may be used by the payment server 1500, the issuer server 1300 and the acquirer server 1400 as a payment interchange network. Examples of payment interchange network include, but not limited to, Mastercard® payment system interchange network. The payment server 1500 includes a processing system 1505 configured to extract programming instructions from a memory 1510 to provide various features of the present disclosure. The components of the payment server 1500 provided herein may not be exhaustive and that the payment server 1500 may include more or fewer components than that of depicted in FIG. 15. Further, two or more components may be embodied in one single component, and/or one component may be configured using multiple sub-components to achieve the desired functionalities. Some components of the payment server 1500 may be configured using hardware elements, software elements, firmware elements and/or a combination thereof.

Via a communication interface 1515, the processing system 1505 receives request from a remote device 1520 such as the acquirer server 1400 or a user device (e.g., the user device 104) associated with a user (e.g., the user 102). The request may be a payment transaction request from the acquirer server 1400 or the user device 104. The communication may be achieved through API calls, without loss of generality. The payment server 1500 includes a database, such as a transaction database 1525. The transaction database 1525 may include transaction processing data, such as Issuer ID, country code, acquirer ID, among others. The transaction database 1525 further manages a usage analytics module 1530 and a user profile module 1535. The usage analytics module 1530 stores historical usage analytics data associated with a plurality of users. The usage analytics data includes but not limited to a type of user device, a web browser information and a typing speed of the user for each payment transaction. The user profile module 1535 is configured to store user profile information of the plurality of users. The user profile information includes historical authentication time used by the user for authenticating payment transactions for each authentication option. In addition, the processing system 1505 may store information of the merchant and the user 102.

Figure 16:
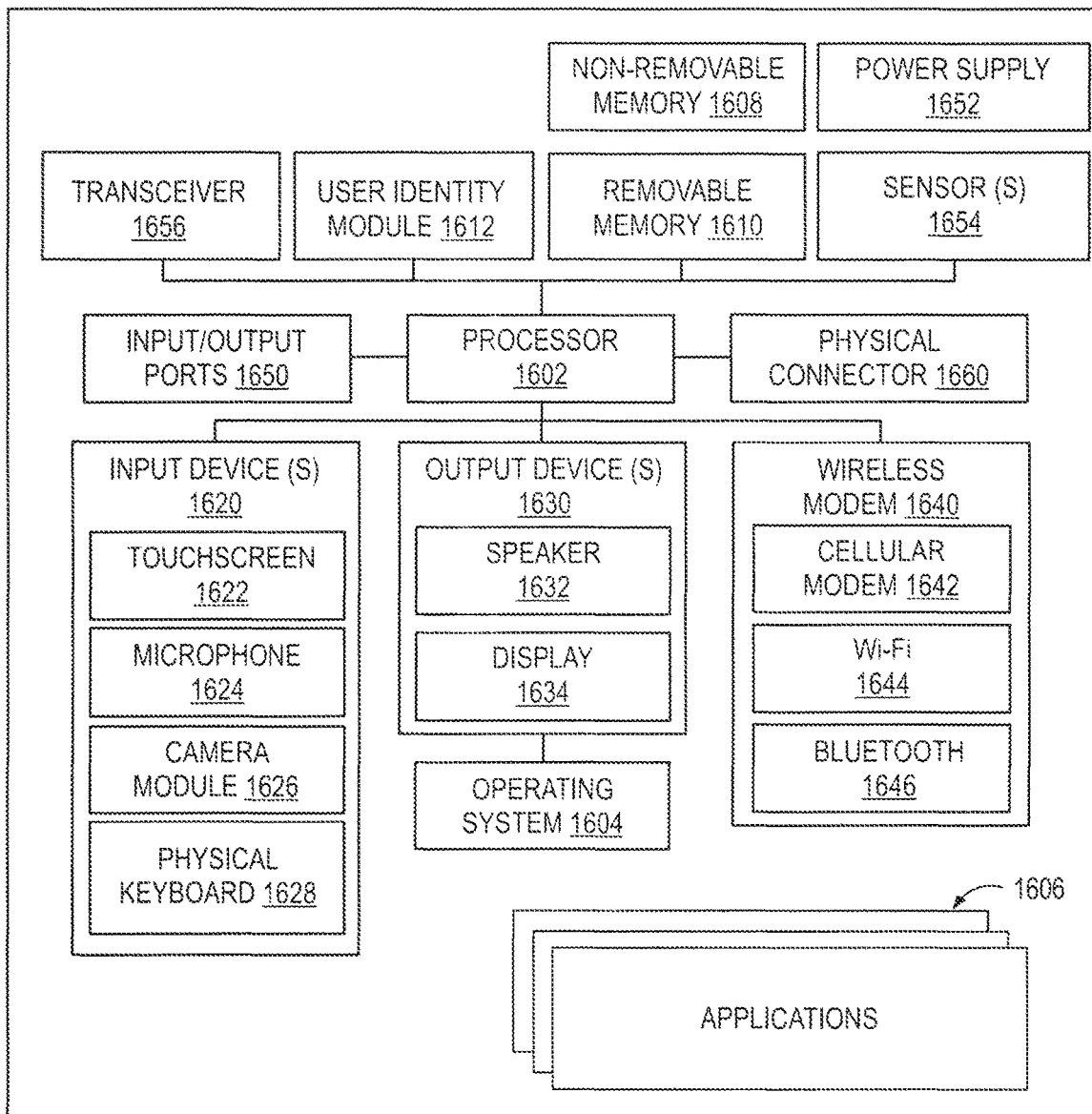
FIG. 16 shows simplified block diagram of a user device, for example, a mobile phone capable of implementing the various embodiments of the present disclosure.

FIG. 16 shows simplified block diagram of a user device 1600, for example, a mobile phone capable of implementing at least some embodiments of the present disclosure. The user device 1600 is depicted to include one or more applications 1606. The user device 1600 is an example of the user device 104.

It should be understood that the user device 1600 as illustrated and hereinafter described is merely illustrative of one type of device and should not be taken to limit the scope of the embodiments. As such, it should be appreciated that at least some of the components described below in connection with that the user device 1600 may be optional and thus in an example embodiment may include more, less or different components than those described in connection with the example embodiment of the FIG. 16. As such, among other examples, the user device 1600 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1600 includes a controller or a processor 1602 (e.g., a signal processor, microprocessor, ASIC, or other control and processing logic circuitry) for performing such tasks as signal coding, data processing, image processing, input/output processing, power control, and/or other functions. An operating system 1604 controls the allocation and usage of the components of the user device 1600 and support for one or more applications programs (see, the applications 1606), such as the merchant interface 106, a payment interface 910 for facilitating payment to a merchant or an authentication interface 1020 for authentication of a payment transaction. Additionally, the application interface may be accessed to provide merchant information of the second merchant and search for merchant terminals in a predefined area of the second merchant. In addition to the application interface, the applications 1606 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1600 includes one or more memory components, for example, a non-removable memory 1608 and/or a removable memory 1610. The non-removable memory 1608 and/or the removable memory 1610 may be collectively known as database in an embodiment. The non-removable memory 1608 can include RAM, ROM, flash memory, a hard disk, or other well-known memory storage technologies. The removable memory 1610 can include flash memory, smart cards, or a Subscriber Identity Module (SIM). The one or more memory components can be used for storing data and/or code for running the operating system 1604 and the applications 1606. The user device 1600 may further include a user identity module (UIM) 1612. The UIM 1612 may be a memory device having a processor built in. The UIM 1612 may include, for example, a subscriber identity module (SIM), a universal integrated circuit card (UICC), a universal subscriber identity module (USIM), a removable user identity module (R-UIM), or any other smart card. The UIM 1612 typically stores information elements related to a mobile subscriber. The UIM 1612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1600 can support one or more input devices 1620 and one or more output devices 1630. Examples of the input devices 1620 may include, but are not limited to, a touch screen/a screen 1622 (e.g., capable of capturing finger tap inputs, finger gesture inputs, multi-finger tap inputs, multi-finger gesture inputs, or keystroke inputs from a virtual keyboard or keypad), a microphone 1624 (e.g., capable of capturing voice input), a camera module 1626 (e.g., capable of capturing still picture images and/or video images) and a physical keyboard 1628. Examples of the output devices 1630 may include but are not limited to a speaker 1632 and a display 1634. Other possible output devices can include piezoelectric or other haptic output devices. Some devices can serve more than one input/output function. For example, the touch screen 1622 and the display 1634 can be combined into a single input/output device.

A wireless modem 1640 can be coupled to one or more antennas (not shown in the FIG. 16) and can support two-way communications between the processor 1602 and external devices, as is well understood in the art. The wireless modem 1640 is shown generically and can include, for example, a cellular modem 1642 for communicating at long range with the mobile communication network, a Wi-Fi compatible modem 1644 for communicating at short range with an external Bluetooth-equipped device or a local wireless data network or router, and/or a Bluetooth-compatible modem 1646. The wireless modem 1640 is typically configured for communication with one or more cellular networks, such as a GSM network for data and voice communications within a single cellular network, between cellular networks, or between the user device 1600 and a public switched telephone network (PSTN).

The user device 1600 can further include one or more input/output ports 1650 for establishing connection with peripheral devices including a power supply 1652, one or more sensors 1654 for example, an accelerometer, a gyroscope, a compass, or an infrared proximity sensor for detecting the orientation or motion of the user device 1600 and biometric sensors for scanning biometric identity of an authorized user, a transceiver 1656 (for wirelessly transmitting analog or digital signals) and/or a physical connector 1660, which can be a USB port, IEEE 1294 (FireWire) port, and/or RS-232 port. The illustrated components are not required or all-inclusive, as any of the components shown can be deleted and other components can be added.

With the application (see, the applications 1606) and/or other software or hardware components, the user device 1600 can implement the technologies described herein. For example, the processor 1602 can cause generation of one or more UIs for displaying a plurality of authentication options and a timeout period of an authentication session for authenticating a payment transaction.

Without in any way limiting the scope, interpretation, or application of the claims appearing below, a technical effect of one or more of the example embodiments disclosed herein is to provide methods and systems for managing timeout period of an authentication session. Various embodiments of the present disclosure provide methods for dynamically adapting the timeout period of the authentication session based on the authentication session. Further, the limitation of fixed timeout periods for every authentication session may be precluded thereby effectively utilizing resources and limiting fraudulent activities.

The disclosed methods with reference to FIGS. 1 to 16, or one or more operations of the flow diagram 1100 or 1110 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1200 (e.g., the servers 112, 114 and 116) and its various components such as the computer system 1205 and the database 1210 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A method, comprising:
receiving, by a server system associated with a payment network, a payment transaction request for a payment transaction by a payment card of a user, the payment transaction request comprising information of the payment card;
upon receiving the payment transaction request, facilitating, by the server system, a selection of an authentication option from a plurality of authentication options presented to the user on an interface related to enabling payment and authorization using the payment card, the plurality of authentication options presented for authenticating the payment transaction associated with the payment transaction request;
upon receiving the selection of the authentication option, dynamically adapting, by the server system, a timeout period of an authentication session for authenticating the payment transaction based on the selection of the authentication option; and
terminating, by the server system, the authentication session upon expiry of the timeout period,
wherein the timeout period is dynamically adapted based on a plurality of timers, each timer of the plurality of timers being associated with one or more authentication options of the plurality of authentication options, and
wherein the dynamically adapting the timeout period comprises:
accessing, by the server system, a first timer among the plurality of timers associated with the authentication option and a second timer among the plurality of timers associated with an alternate authentication option;
accessing, by the server system, a predefined rule among a set of predefined rules corresponding to overriding the authentication option; and
adapting, by the server system, the timeout period based on at least one from among the first timer, the second timer and the predefined rule for overriding.

2. The method as claimed in claim 1, further comprising:
receiving, by the server system, a user preference input for configuring the plurality of timers; and
storing, by the server system, the user preference input.

3. The method as claimed in claim 1, wherein the dynamically adapting the timeout period comprises:
determining, by the server system, the timeout period based at least on the set of predefined rules, the set of predefined rules defined based on one or more timers of the plurality of timers; and
facilitating, by the server system, display of the timeout period on the interface.

4. The method as claimed in claim 3, further comprising:
determining, by the server system, the timeout period for the payment transaction based at least one on a plurality of usage analytics data, the plurality of usage analytics data including one or more of a type of a user device and web browser information.

5. The method as claimed in claim 3, further comprising:
accessing, by the server system, a user profile information of the user, the user profile information comprising a historical authentication time for authenticating a set of historical payment transactions based on the authentication option; and
determining, by the server system, the timeout period for the payment transaction based at least on the authentication option, the set of predefined rules and the user profile information.

6. The method as claimed in claim 3, further comprising:
receiving, by the server system, the alternate authentication option from the user for authenticating the payment transaction by overriding the authentication option selected prior by the user, the alternate authentication option selected from a remainder of the plurality of authentication options.

7. The method as claimed in claim 1, further comprising:
receiving, by the server system, a plurality of usage analytics data associated with the user from a merchant interface, the plurality of usage analytics data comprising one or more of:
a type of a user device, and
a web browser information.

8. The method as claimed in claim 1, wherein the plurality of authentication options is at least one of:
a One-Time Password (OTP) option;
a Quick Response (QR) code option;
a static password option; and
a biometric-based password option.

9. A server system, comprising:
a memory comprising executable instructions; and
a processor communicably configured to execute the instructions to cause the server system to at least perform
receiving a payment transaction request from a merchant interface for a payment transaction by a payment card of a user, the payment transaction request comprising information of the payment card,
upon receiving the payment transaction request, facilitating a selection of an authentication option from a plurality of authentication options presented to the user on an interface related to enabling payment and authorization using the payment card, the plurality of authentication options presented for authenticating the payment transaction associated with the payment transaction request;
upon receiving the authentication option, dynamically adapting a timeout period of an authentication session for authenticating the payment transaction based on the authentication option; and
terminating the authentication session upon expiry of the timeout period,
wherein the timeout period is dynamically adapted based on a plurality of timers, each timer of the plurality of timers being associated with one or more authentication options of the plurality of authentication options, and
wherein the dynamically adapting the timeout period comprises:
accessing a first timer among the plurality of timers associated with the authentication option and a second timer among the plurality of timers associated with an alternate authentication option;
accessing a predefined rule among a set of predefined rules corresponding to overriding the authentication option; and
adapting the timeout period based on the first timer, the second timer and the predefined rule for overriding.

10. The server system as claimed in claim 9, wherein the server system is further configured to perform:
accessing a user profile information of the user, the user profile information comprising a historical authentication time for authenticating a set of historical payment transactions based on the authentication option; and
determining the timeout period for authenticating the payment transaction based at least on the authentication option, a timer associated with the authentication option and the historical authentication time.

11. The server system as claimed in claim 9, wherein the plurality of authentication options is at least one of:
a One-Time Password (OTP) option;
a Quick Response (QR) code option;
a static password option; and
a biometric-based password option.

12. A method for dynamically adapting a timeout period of a payment transaction, the method comprising:
receiving, by a server system associated with a payment network, a payment transaction request initiated from a merchant interface for the payment transaction by a payment card of a user, the payment transaction request comprising a payment card information of the payment card of the user;
upon receiving the payment transaction request, provisioning, by the server system, a plurality of authentication options for the user to authenticate the payment transaction on an interface related to enabling payment and authorization using the payment card, the plurality of authentication options comprising a one-time password (OTP) option and a static password option;
receiving, by the server system, a selection of an authentication option among the plurality of options from the user;
adapting, by the server system, the timeout period of an authentication session for authenticating the payment transaction based on the selection of the authentication option and one or more of a set of predefined rules, a plurality of usage analytics data, and a user profile information, the plurality of usage analytics data including one or more of a type of a user device and web browser information; and
terminating, by the server system, the authentication session upon expiry of the timeout period.

13. The method as claimed in claim 12, wherein the plurality of authentication options further comprises:
a Quick Response (QR) code option; and
a biometric-based password option.

14. The method as claimed in claim 12, wherein the user profile information comprises a historical authentication time for authenticating historical payment transactions based on the authentication option.

\* \* \* \* \*